United States Patent
Yamada

(10) Patent No.: US 11,307,740 B2
(45) Date of Patent: Apr. 19, 2022

(54) DISPLAY METHOD FOR CHANGING THE DISPLAY FORMAT OF AN IMAGE GROUP BASED ON A SIDE LENGTH RATIO

(71) Applicant: Seiko Epson Corporation, Tokyo (JP)

(72) Inventor: Yusuke Yamada, Shiojiri (JP)

(73) Assignee: Seiko Epson Corporation

( * ) Notice: Subject to any disclaimer, the term of this patent is extended or adjusted under 35 U.S.C. 154(b) by 125 days.

(21) Appl. No.: 16/798,529

(22) Filed: Feb. 24, 2020

(65) Prior Publication Data

US 2020/0272290 A1 Aug. 27, 2020

(30) Foreign Application Priority Data

Feb. 25, 2019 (JP) .............................. JP2019-031327

(51) Int. Cl.
　　*G09G 5/00*　　(2006.01)
　　*G06F 3/0483*　(2013.01)
　　*G06F 3/147*　　(2006.01)
　　*G09G 3/34*　　(2006.01)

(52) U.S. Cl.
　　CPC ............ *G06F 3/0483* (2013.01); *G06F 3/147* (2013.01); *G09G 3/344* (2013.01); *G09G 2380/14* (2013.01)

(58) Field of Classification Search
None
See application file for complete search history.

(56) References Cited

U.S. PATENT DOCUMENTS

| 6,836,878 | B1* | 12/2004 | Cuomo | ..................... G06F 8/34 717/100 |
| 2006/0293771 | A1* | 12/2006 | Tazine | ................... G11B 27/34 700/94 |
| 2011/0107220 | A1* | 5/2011 | Perlman | ............... H04N 19/166 715/720 |

(Continued)

FOREIGN PATENT DOCUMENTS

| JP | 2006-229291 A | 8/2006 |
| JP | 2012-164292 A | 8/2012 |

(Continued)

*Primary Examiner* — Anh-Tuan V Nguyen
(74) *Attorney, Agent, or Firm* — Harness, Dickey & Pierce, P.L.C.

(57) ABSTRACT

Provided is a display method of displaying on a display unit 2, an image group in which a plurality of images arranged on a first virtual axis are rotated about each of second virtual axes intersecting the first virtual axis, and further rotated about the first virtual axis, and are arranged side by side in a first direction, in which a length of the image in the first direction or a length of the image in a second direction which intersects the first direction is set such that, when a ratio of the length of the image in the first direction to the length of the image in the second direction is within a predetermined range, a shorter length of the length of the image in the first direction and the length of the image in the second direction is set to be constant in the image group, and when the ratio of the length of the image in the first direction to the length of the image in the second direction is outside the predetermined range, a longer length of the length of the image in the first direction and the length of the image in the second direction is set to be constant in the image group.

6 Claims, 17 Drawing Sheets

(56) References Cited

U.S. PATENT DOCUMENTS

| | | | |
|---|---|---|---|
| 2012/0204099 A1 | 8/2012 | Yamada | |
| 2012/0221943 A1 | 8/2012 | Yamada | |
| 2012/0287165 A1 | 11/2012 | Yamada | |
| 2013/0101210 A1* | 4/2013 | Tang | G06K 9/3233 |
| | | | 382/165 |
| 2015/0365548 A1* | 12/2015 | Katsumata | G06F 3/1272 |
| | | | 715/784 |
| 2019/0028596 A1* | 1/2019 | Shiratori | H04N 1/00954 |
| 2019/0138175 A1* | 5/2019 | Lucca | G06F 3/04817 |

FOREIGN PATENT DOCUMENTS

| | | |
|---|---|---|
| JP | 2012-178002 A | 9/2012 |
| JP | 2012-238223 A | 12/2012 |

* cited by examiner

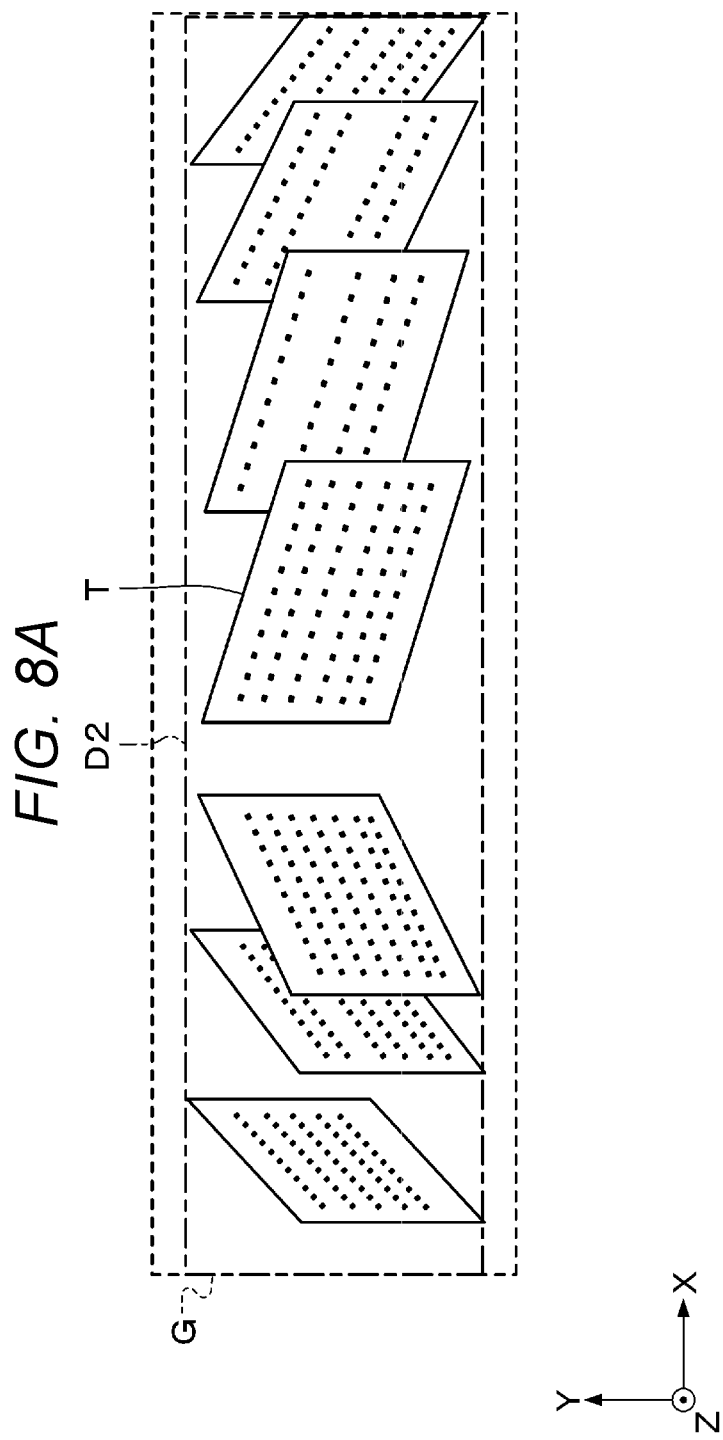

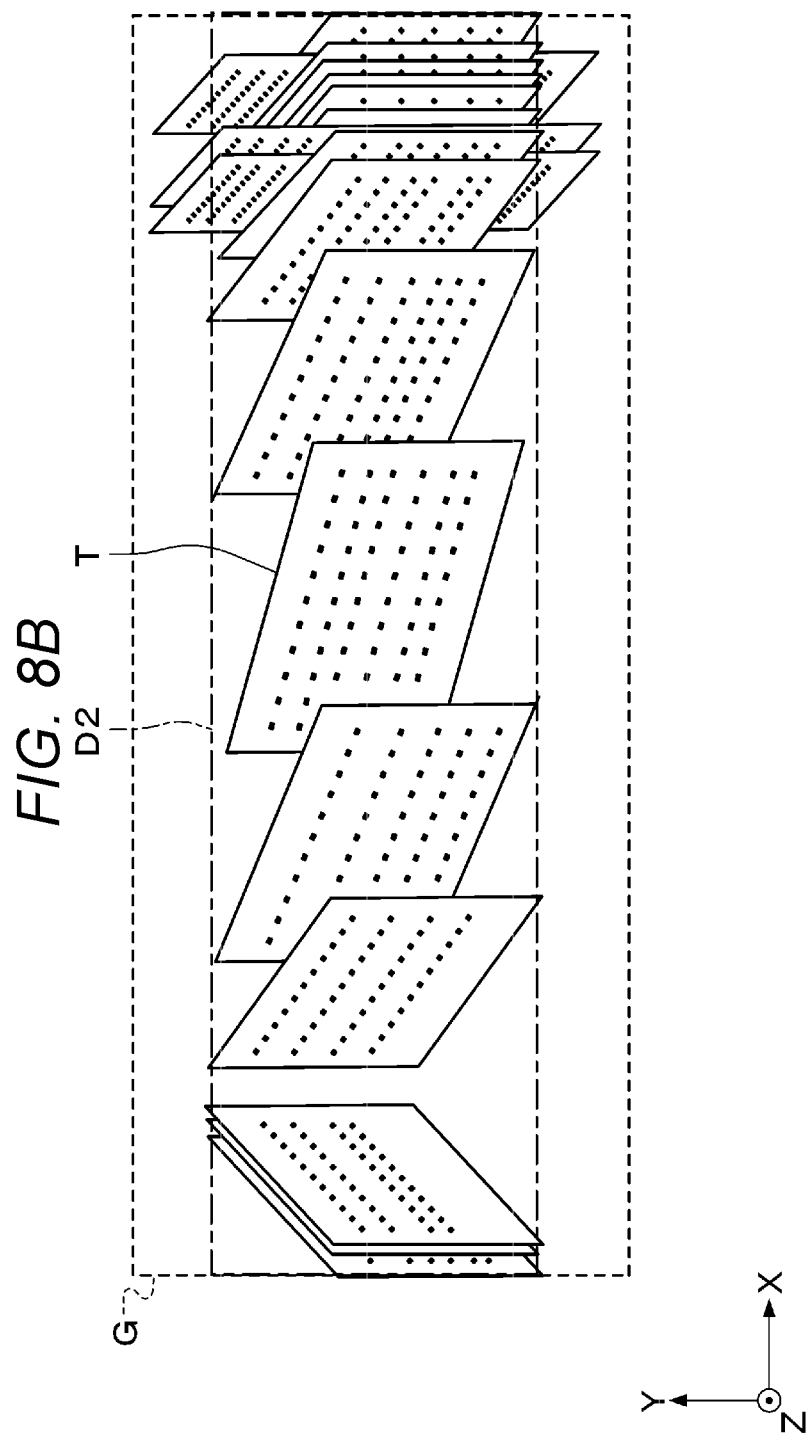

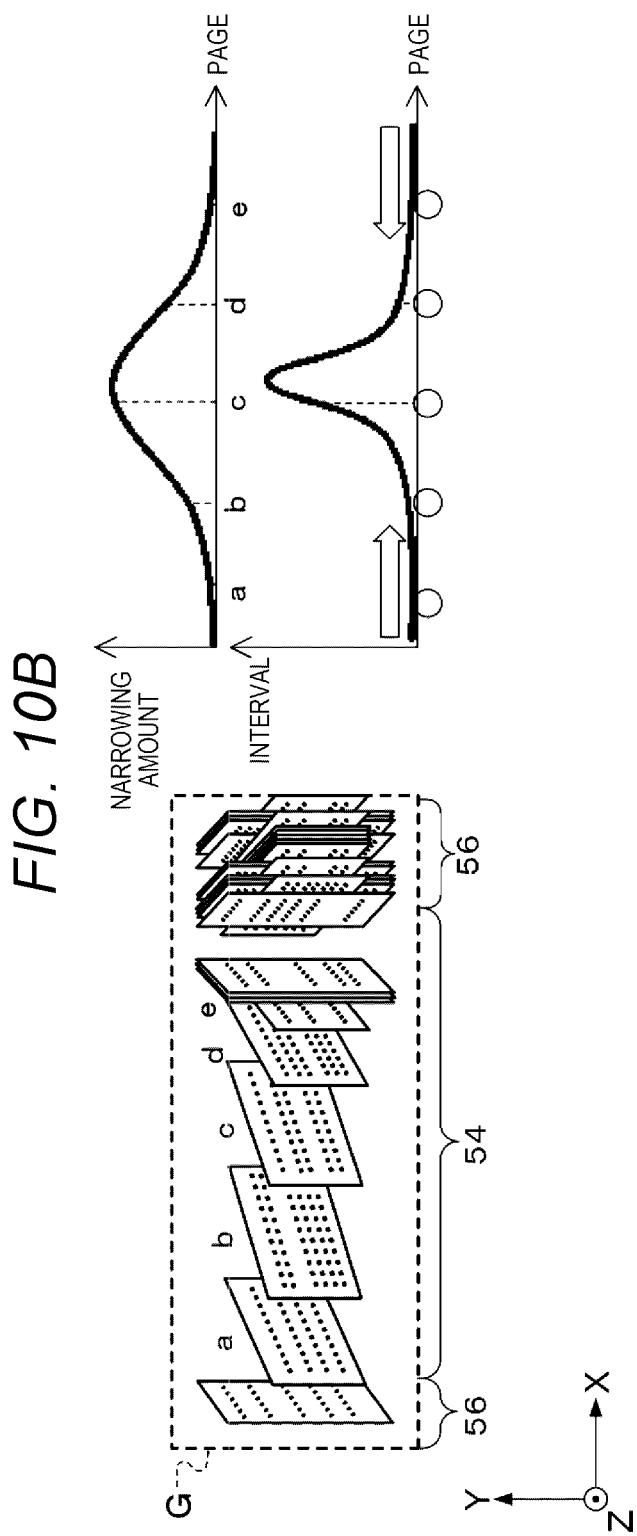

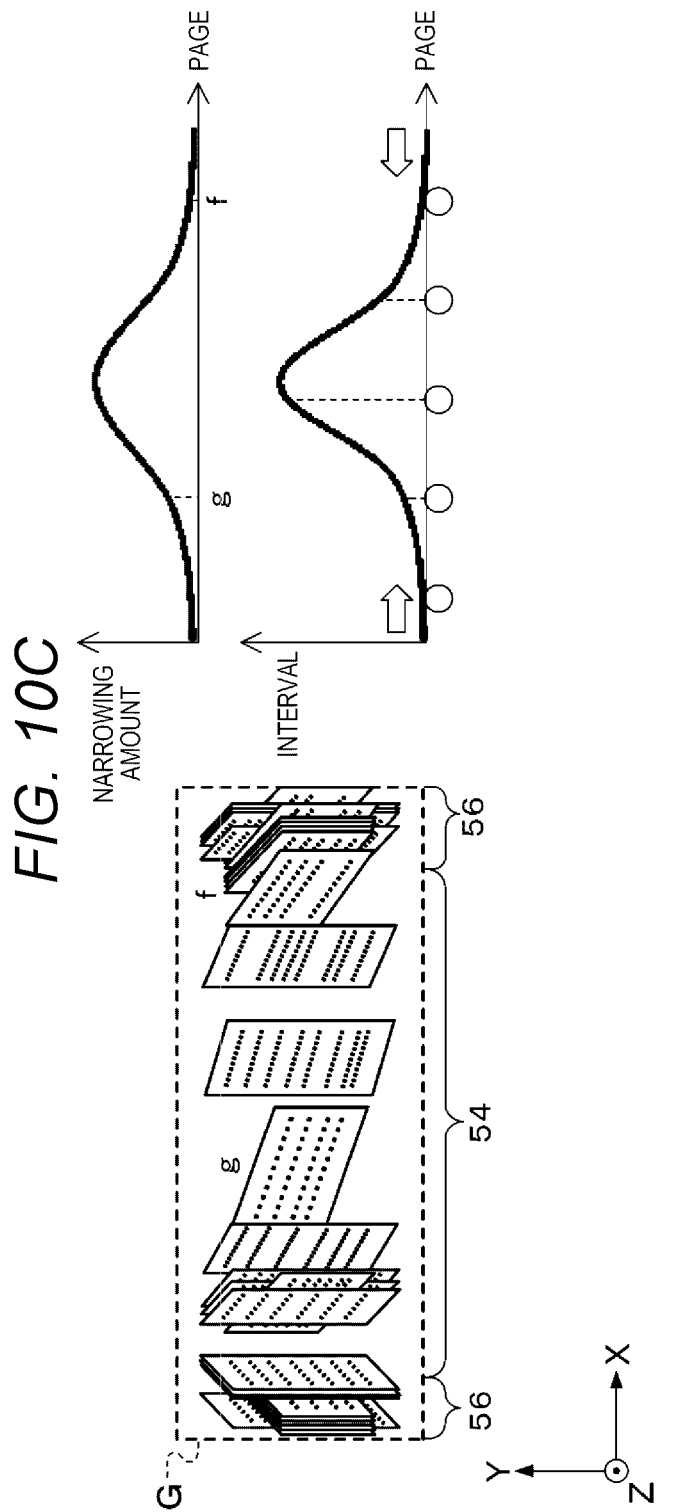

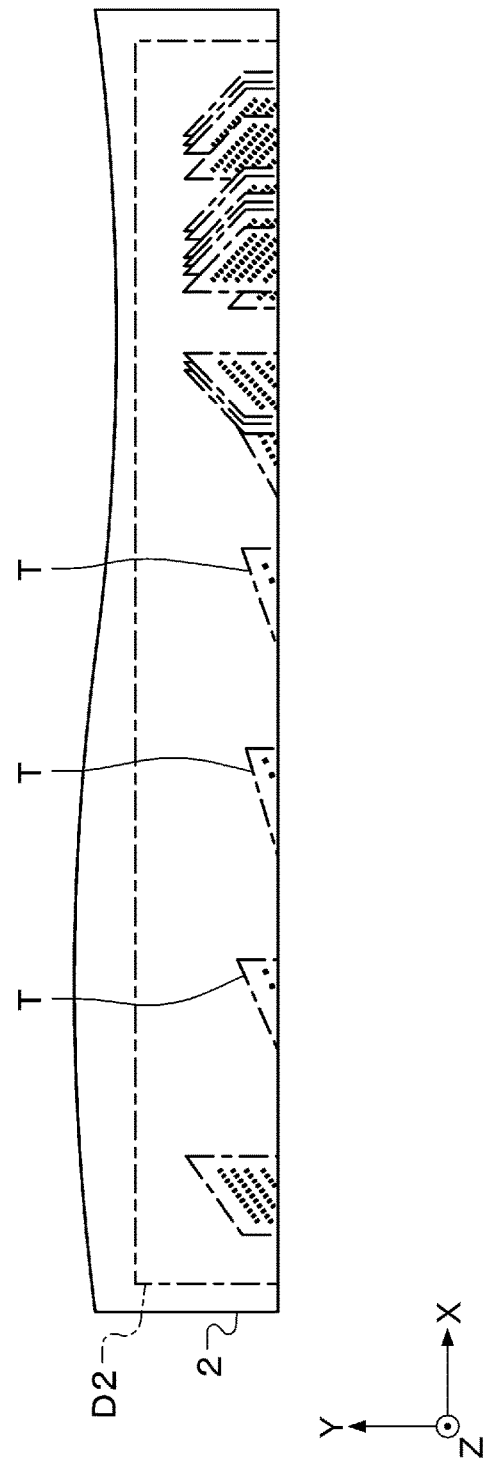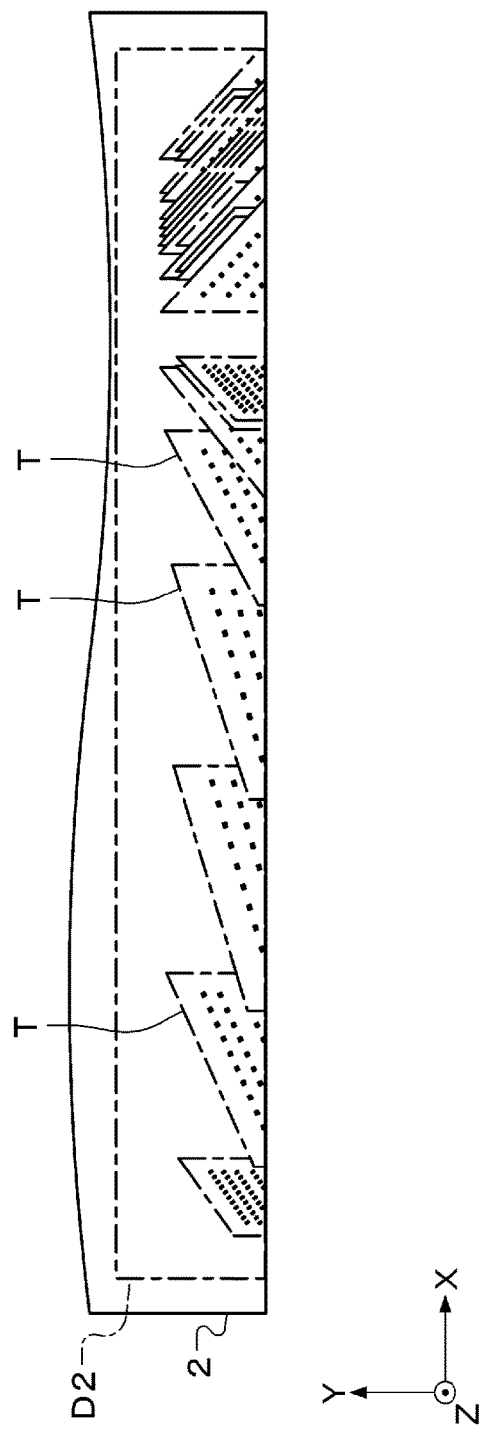

DISPLAY METHOD FOR CHANGING THE DISPLAY FORMAT OF AN IMAGE GROUP BASED ON A SIDE LENGTH RATIO

The present application is based on, and claims priority from, JP Application Serial Number 2019-031327, filed Feb. 25, 2019, the disclosure of which is hereby incorporated by reference herein in its entirety.

BACKGROUND

1. Technical Field

The present disclosure relates to a display method and a display apparatus.

2. Related Art

In the related art, a technique for displaying a document and an image formed by a plurality of pages is known. For example, there has been proposed an image processing apparatus that displays a predetermined number of images in which both vertical imaging and horizontal imaging are mixed and displayed in a list or sequentially in a predetermined order (for example, see JP-A-2006-229291).

In a case where a vertically captured thumbnail image that is long in the vertical direction and a horizontally captured thumbnail image that is long in the horizontal direction are mixed, the image processing apparatus uniformly sets the lengths of the thumbnail images in the vertical direction. In the image processing apparatus, the thumbnail image that is long in the vertical direction and the thumbnail image that is long in the horizontal direction are mixed and arranged on a plane so as to eliminate a wasted space.

However, in JP-A-2006-229291, when the thumbnail image that is long in the vertical direction and the thumbnail image that is long in the horizontal direction are mixed, when the length of the thumbnail images in the vertical direction is uniformly set, the thumbnail image that is long in the vertical direction is displayed smaller as compared with the thumbnail image that is long in the horizontal direction. Further, when the length of the thumbnail images in the horizontal direction is uniformly set, the thumbnail image that is long in the horizontal direction is displayed smaller as compared with the thumbnail image that is long in the vertical direction. Therefore, there is a concern that it is difficult for a user to browse thumbnail images.

Further, when the thumbnail image that is long in the vertical direction and the thumbnail image that is long in the horizontal direction are mixed and arranged on the plane so as to eliminate a wasted space, it is necessary to collectively arrange each of the thumbnail images that are long in the vertical direction and the thumbnail images that are long in the horizontal direction, for each line on which the images are arranged. Therefore, there is a possibility that the relationship between the thumbnail images is lost because the order of the thumbnail images is changed.

SUMMARY

A display method according to an aspect of the present disclosure is a display method of displaying on a display unit, an image group in which a plurality of images arranged on a first virtual axis are rotated about each of second virtual axes intersecting the first virtual axis, and further rotated about the first virtual axis, and are arranged side by side in a first direction, in which a length of the image in the first direction or a length of the image in a second direction which intersects the first direction is set such that, when a ratio of the length of the image in the first direction to the length of the image in the second direction is within a predetermined range, a shorter length of the length of the image in the first direction and the length of the image in the second direction is set to be constant in the image group, and when the ratio of the length of the image in the first direction to the length of the image in the second direction is outside the predetermined range, a longer length of the length of the image in the first direction and the length of the image in the second direction is set to be constant in the image group.

In the above display method, the predetermined range may be a range of $1/\sqrt{2}$ or more and $\sqrt{2}$ or less.

In the above display method, the longer length of the length of the image in the first direction and the length of the image in the second direction may be set to a predetermined value.

In the above display method, the image may be displayed to fit in an occupied area with the ratio of the length of the image in the first direction to the length of the image in the second direction, as a predetermined aspect ratio.

In the display method, in the image group, when there are more images that are longer in the first direction than the second direction than the images that are longer in the second direction than the first direction, an interval between the images may be displayed wider than when there are more images that are longer in the second direction than the first direction.

In the above display method, when a display area in which the image group may be displayed is below a predetermined value, either one of both end portions, that face each other in the second direction, of a plurality of the images may be aligned and displayed.

A display apparatus according to another aspect of the present disclosure includes: a display unit displaying an image group in which a plurality of images are arranged side by side in a first direction; and an image generation unit generating the images by rotating each of the plurality of images arranged on a first virtual axis about each of second virtual axes intersecting the first virtual axis and further rotating the images about the first virtual axis, in which the image generation unit has a setting unit which sets a length of the image in the first direction or a length of the image in a second direction which intersects the first direction such that, when a ratio of the length of the image in the first direction to the length of the image in the second direction is within a predetermined range, a shorter length of the length of the image in the first direction and the length of the image in the second direction is set to be constant in the image group, and when the ratio of the length of the image in the first direction to the length of the image in the second direction is outside the predetermined range, a longer length of the length of the image in the first direction and the length of the image in the second direction is set to be constant in the image group.

BRIEF DESCRIPTION OF THE DRAWINGS

FIG. 8A is a diagram for explaining a thumbnail image group that fits in a predetermined aspect ratio.

FIG. 8B is a diagram for explaining the thumbnail image group including thumbnail images that deviate from the predetermined aspect ratio.

FIG. 10B is a diagram for explaining the normal distribution area adjustment when the thumbnail image that is long in the vertical direction and the thumbnail image that is long in the horizontal direction are mixed.

FIG. 10C is a diagram for explaining the normal distribution area adjustment when the thumbnail image that is long in the vertical direction and the thumbnail image that is long in the horizontal direction are mixed.

FIG. 11A is a diagram for explaining an arrangement of the thumbnail images when a display range of the thumbnail image group deviates from the image display unit.

FIG. 11B is a diagram for explaining an arrangement of the thumbnail images when a display range of the thumbnail image group deviates from the image display unit.

DESCRIPTION OF EXEMPLARY EMBODIMENTS

First Embodiment

Figure 1:
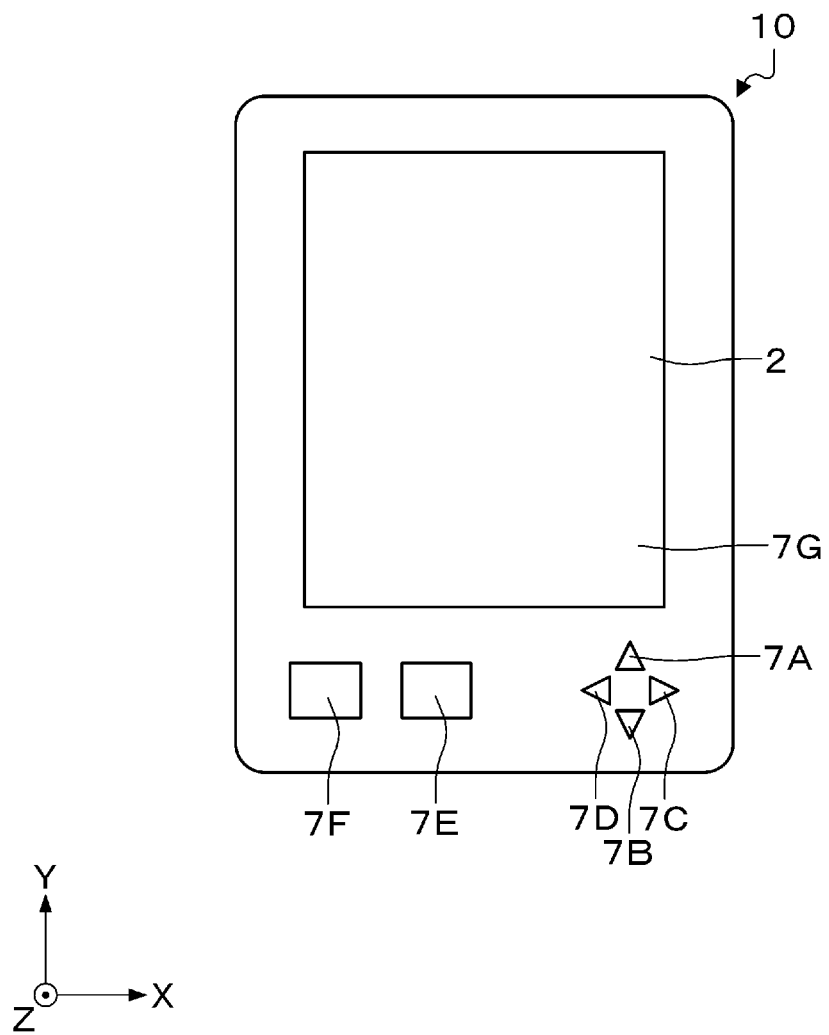
FIG. 1 is a diagram showing an appearance of a viewer according to a first embodiment.

Hereinafter, a display method and a display apparatus according to the present embodiment will be described with reference to the drawings. In the present embodiment, an explanation will be given by taking as an example a viewer that can browse and edit an electronic manual, an electronic book, or a document created by a user, which is an example of a document including images, as a display apparatus. In the drawings referred to in the following description, the vertical and horizontal scales of members or portions may be expressed differently from actual ones for convenience of explanation and illustration. In addition, illustrations of components other than those necessary for the explanation may be omitted. In the following, for convenience of explanation, FIGS. 1, 2, 7A to 7E, 8A, 8B, 10A to 10C, 11A, and 11B show an X axis, a Y axis, and a Z axis as three axes orthogonal to each other, and a tip side of an arrow indicating each axis is "+", and a proximal side is "−". Further, the direction along the X axis is referred to as a "horizontal direction" as a first direction, the direction along the Y axis is referred to as a "vertical direction" as a second direction, and the direction along a Z axis is referred to as a "depth direction". The description will be made with the −X direction in the horizontal direction as a left side and the +X direction as a right side, and the −Y direction in the vertical direction as a bottom side and the +Y direction as a top side. In the present embodiment, the first direction is the horizontal direction and the second direction is the vertical direction. However, the first direction may be the vertical direction and the second direction may be the horizontal direction. That is, the first direction and the second direction only need to intersect each other.

Overview of Viewer

Figure 2:
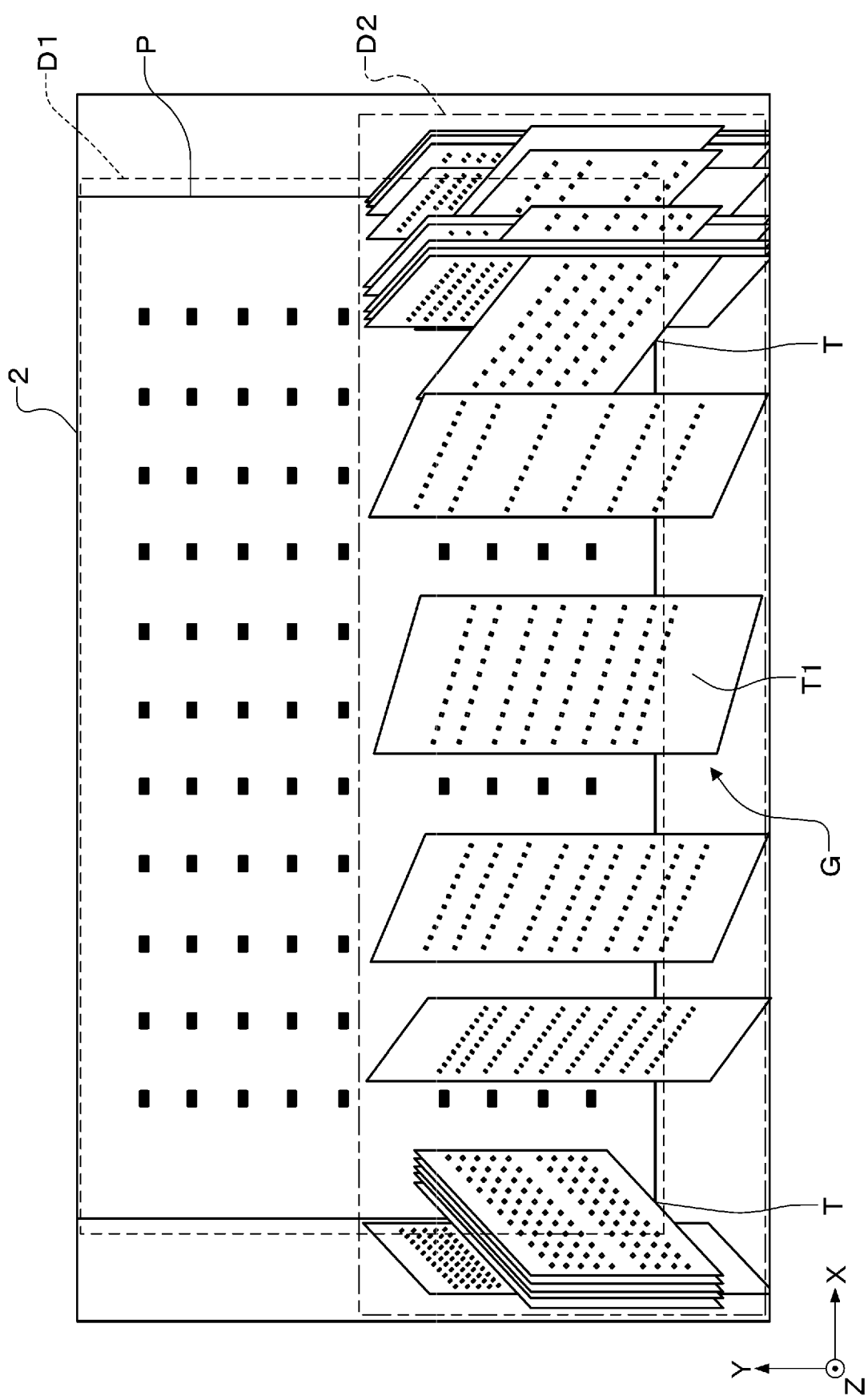
FIG. 2 is a diagram showing a thumbnail image group in which lengths of thumbnail images, which are displayed on an image display unit, in vertical and horizontal directions are mixed.

FIG. 1 is a diagram showing an appearance of a viewer according to the present embodiment, and is a front view of the viewer 10 viewed from an image display unit 2 side as a display unit. FIG. 2 is a diagram showing a thumbnail image group G in which lengths of thumbnail images T, which are displayed on an image display unit 2, in vertical and horizontal directions are mixed. Note that in FIG. 2, characters described on each page in the image are represented by "·" in order to prevent the drawing from becoming complicated. In the thumbnail image group G, a selection page is a thumbnail image T1.

The viewer 10 according to the present embodiment is a display apparatus that displays an image. In this example, the viewer 10 is an apparatus for browsing an electronic book as an example of a document, a so-called electronic book reader. An electronic book is document data including images of a plurality of pages. The viewer 10 displays an electronic book on the image display unit 2 in a certain unit. The certain unit is, for example, one page at a time. Among the plurality of pages included in the electronic book, a page to be displayed on the image display unit 2 is referred to as a selection page. The selection page is changed according to the operation of buttons 7A to 7F or a touch panel 7G shown in FIG. 1 by a user. That is, the user can turn the pages of the electronic book by operating the buttons 7A to 7F or the touch panel 7G. The viewer 10 has a function of executing an application program in addition to browsing electronic books.

As shown in FIG. 2, the image display unit 2 according to the present embodiment displays each page image P of an electronic manual, an electronic book, or a document created by a user, and displays a thumbnail image T as an image obtained by reducing each page image P. The image display unit 2 displays a thumbnail image group G as an image group in which a plurality of thumbnail images T are arranged side by side in the horizontal direction.

The thumbnail image group G is arranged along a lower side of the image display unit 2 in a lower portion of the image display unit 2 that is a bottom side in the vertical direction.

The thumbnail image T is an image having a size that occupies a part of the image display unit 2 and is an image obtained by reducing or enlarging the original image. The original image is an electronic manual, an electronic book, or an image of a document data page created by a user. The original image may be an icon of an application program or an operation screen of an application program. An application program and its operation may be assigned to each of the plurality of thumbnail images T.

The viewer 10 includes the buttons 7A to 7F and the touch panel 7G as an input unit 7 on a surface on which the image display unit 2 is disposed. The input unit 7 takes in an input from the outside. The input unit 7 receives an operation from a user and processes the operation as an input signal. That is, the user can operate the input unit 7 to perform a predetermined input on the viewer 10.

System Configuration of Viewer

Figure 3:
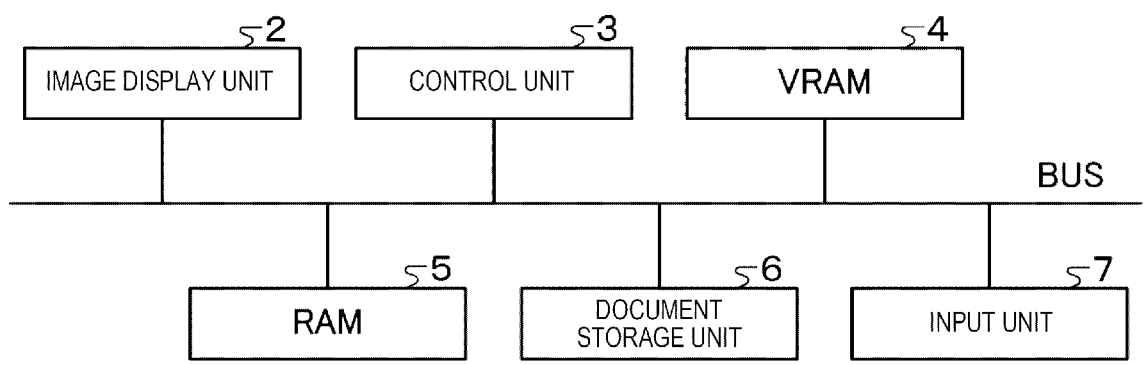
FIG. 3 is a block diagram showing a system configuration of a viewer.

FIG. 3 is a block diagram showing a system configuration of the viewer 10.

The viewer 10 includes the image display unit 2 connected to a bus BUS, a control unit 3, a video random access memory (VRAM) 4, a random access memory (RAM) 5, a document storage unit 6, and the input unit 7. Signals or information between the units connected to the bus transferred via the bus.

The image display unit 2 displays a page image P and a thumbnail image T1 corresponding to the page image P. The image display unit 2 displays the thumbnail image group G in which the plurality of thumbnail images T are arranged side by side in the horizontal direction. The image display unit 2 displays the plurality of thumbnail images T in a state where the thumbnail image group G is viewed from above. As shown in FIG. 7E, the image display unit 2 displays a bird's-eye view image that is an image obtained by viewing the thumbnail image group G arranged in a virtual space from any viewpoint in the virtual space including a first virtual rotation axis Q as a first virtual axis and a second virtual rotation axis M as a second virtual axis.

The image display unit 2 includes a display drive circuit (not shown) that outputs a signal for displaying an image on a liquid crystal panel or the like. As for the image display unit 2, the image data stored in the VRAM 4 is displayed in the image display unit 2 as an image.

The control unit 3 is a device that controls each unit of the viewer 10, for example, is a microcomputer having a central processing unit (CPU), a read only memory (ROM), or the like. The CPU executes a program stored in the ROM or RAM 5 using the RAM 5 as a work area. The ROM stores, for example, an operating system (OS) program for controlling basic operations of the viewer 10.

The control unit 3 controls each unit of the viewer 10 based on the program stored in the ROM. For example, the control unit 3 performs control to store various image data in the VRAM 4, and performs control to operate the viewer 10 based on the operated buttons 7A to 7F, the touch panel 7G, or the content by specifying the buttons 7A to 7F, the touch panel 7G, or the content operated by a user from the input signal sent from the input unit 7. Further, the control unit 3 controls image processing with respect to the image displayed on the image display unit 2. As the image processing, for example, editing of the page image P or highlight display processing for the thumbnail image T are performed.

The VRAM 4 is a memory that stores image data indicating an image to be displayed on the image display unit 2. The VRAM 4 is a memory that stores the developed image data. The image data stored in the VRAM 4 is displayed on the image display unit 2.

The RAM 5 is a memory in which the content of the image processing executed by the control unit 3 and the association with the image data are stored.

A document storage unit 6 is a rewritable memory, and stores document data such as an electronic manual, an electronic book, or a document created by a user. The document storage unit 6 can store a plurality of different document data and can appropriately rewrite the document data. The document storage unit 6 is a non-volatile memory that stores various data and application programs in addition to the document data. The document storage unit 6 may be, for example, a semiconductor memory built in the viewer 10 or a removable external memory such as an SD memory card.

The input unit 7 includes the buttons 7A to 7F shown in FIG. 1. When the buttons 7A to 7F are operated, the input unit 7 transmits the input signal corresponding to the operated button to the control unit 3. The input unit 7 includes the touch panel 7G. The touch panel 7G is, for example, a smartphone screen.

Figure 4:
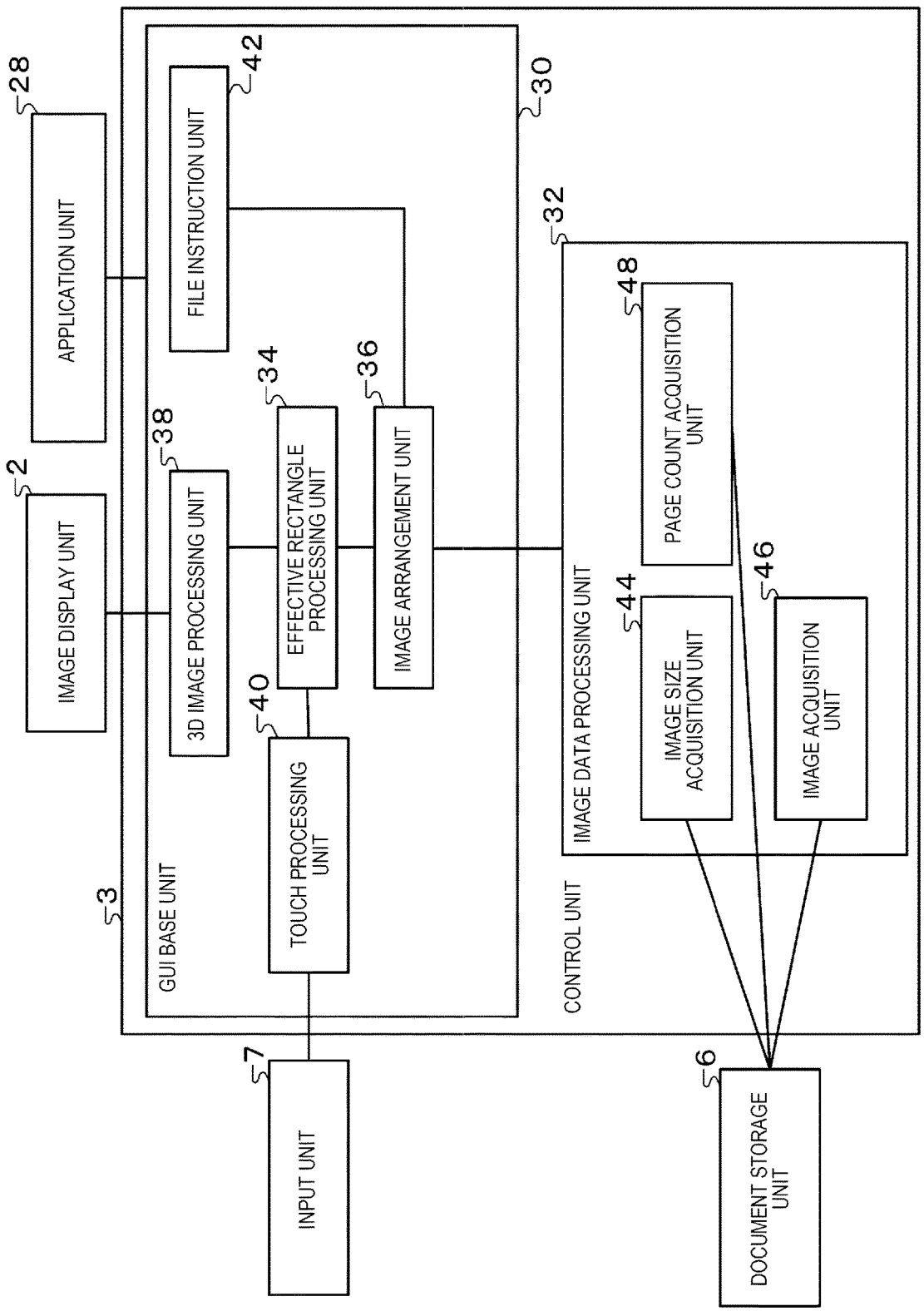
FIG. 4 is a block diagram showing a system configuration of the viewer.

FIG. 4 is a block diagram showing a system configuration of the viewer 10.

The control unit 3 includes a GUI base unit 30 as an image generation unit and an image data processing unit 32.

The GUI base unit 30 causes each of the plurality of thumbnail images T arranged on the first virtual rotation axis Q to rotate about each second virtual rotation axis M intersecting the first virtual rotation axis Q and further to rotate about the first virtual rotation axis Q, and then generates the thumbnail images T. The GUI base unit 30 generates a bird's-eye view image that is an image of the thumbnail image group G arranged in the virtual space from any viewpoint in the virtual space.

The GUI base unit 30 includes an effective rectangle processing unit 34, an image arrangement unit 36 as a setting unit, a 3D image processing unit 38, a touch processing unit 40, and a file instruction unit 42.

The effective rectangle processing unit 34 sets a thumbnail image display area D2 as an occupied area.

In the image arrangement unit 36, in the horizontal direction length or the vertical direction length of the thumbnail image T, when a ratio, of the horizontal direction length to the vertical direction length of the thumbnail image T, is within a predetermined range, a shorter length, of the horizontal direction length and the vertical direction length of the thumbnail image T, is set to be constant in the thumbnail image group G. The ratio, of the horizontal direction length to the vertical direction length of the thumbnail image T, is "vertical direction length/horizontal direction length", for example.

In the image arrangement unit 36, in the horizontal direction length or the vertical direction length of the thumbnail image T, when a ratio, of the horizontal direction length to the vertical direction length of the thumbnail image T, is outside the predetermined range, a longer length, of the horizontal direction length and the vertical direction length of the thumbnail image T, is set to be constant in the thumbnail image group G. The ratio, of the horizontal direction length to the vertical direction length of the thumbnail image T, is "vertical direction length/horizontal direction length", for example.

The image arrangement unit 36 sets the above-described predetermined range to a range of $1/\sqrt{2}$ or more and $\sqrt{2}$ or less. According to this, in the thumbnail image group G, it is possible to arrange the balanced thumbnail images T.

The image arrangement unit 36 processes the longer length, of the vertical direction length and the horizontal direction length of the thumbnail image T, so as to be a predetermined value. In other words, when the horizontal direction length of the thumbnail image T is less than a certain value, it is processed so as not to be further shortened. According to this, it is possible to prevent the longer length of the thumbnail image T from exceeding the limit height of the thumbnail image T that is long in the vertical direction and the limit width of the thumbnail image T that is long in the horizontal direction. As a result, a user can easily discriminate the description content of the thumbnail images T while checking a large number of thumbnail images T in a list display.

The image arrangement unit 36 determines whether the original image of the document data page is long in the vertical direction. When the original image is long in the horizontal direction, the image arrangement unit 36 sets the enlargement ratio of the original image of the document data page to "vertical direction length of the standard page/vertical direction length of the page". When the original image is long in the vertical direction, the image arrangement unit 36 sets the enlargement ratio of the original image of the document data page to "horizontal direction length of the standard page/horizontal direction length of the page". The horizontal length of the standard page is a horizontal direction length of the standard page image set in advance. The vertical direction length of the page is a vertical direction length of the original image. The horizontal direction length of the page is a horizontal direction length of the original image.

The standard page is a standard page that is the most common pages of the same size in the document data. In general, if it is a document, it is substantially a 5:7 aspect ratio size such as A4 or A3, and if it is an image, it corresponds to a 4:3 or 16:9 aspect ratio size such as L size or panorama of a photograph.

The image arrangement unit 36 sets the size of the standard page to a size within an aspect ratio range of 9/16 or more and 16/9 or less. More desirably, the size of the standard page is set to a size within the aspect ratio range of $1/\sqrt{2}$ or more and $\sqrt{2}$ or less. According to this, in the thumbnail image group G, it is possible to arrange the balanced thumbnail images T suitable for a document and a photograph having a standard aspect ratio.

When the original image is long in the horizontal direction, the image arrangement unit 36 determines whether the original image of the document data page satisfies "enlargement ratio*horizontal direction length of the page>horizontal direction length of the maximum page". In the case of "enlargement ratio*horizontal direction length of the page>horizontal direction length of the maximum page", the image arrangement unit 36 sets the enlargement ratio of the original image of the document data page to horizontal direction length of the maximum page/horizontal direction length of the page".

When the original image is long in the vertical direction, the image arrangement unit 36 determines whether the original image of the document data page satisfies "enlargement ratio*vertical direction length of the page>vertical direction length of the maximum page". In the case of "enlargement ratio*vertical direction length of the page>vertical direction length of the maximum page", the image arrangement unit 36 sets the enlargement ratio of the original image of the document data page to "vertical direction length of the maximum page/vertical direction length of the page".

The image arrangement unit 36 sets a standard aspect ratio. The standard aspect ratio is a ratio of the vertical direction length to the horizontal direction length of the thumbnail image T determined in advance. The image arrangement unit 36 calculates the horizontal direction length of the thumbnail image T at the standard aspect ratio. The image arrangement unit 36 calculates the horizontal direction length of the original image of the document data when the original image of the document data is rotated around the second virtual rotation axis M.

The image arrangement unit 36 sets the center positions of the thumbnail images T at both ends of the thumbnail group G to positions that are shifted from the both ends of the thumbnail image display area D2 to the center by "horizontal direction length/2" of the thumbnail image T. The image arrangement unit 36 calculates the position of each thumbnail image T based on the positions of the thumbnail images T at both ends of the thumbnail group G.

The 3D image processing unit 38 is, for example, a Frame Buffer or a GPU.

The touch processing unit 40 detects a user touch on the touch panel 7G. The touch processing unit 40 acquires a touch signal from the touch panel 7G.

The file instruction unit 42 instructs the image data processing unit 32 to read an original image of a document data page based on the data supplied from the touch processing unit 40. The file instruction unit 42 is, for example, an Android (registered trademark) function of an operating system for mobile devices.

The image data processing unit 32 is, for example, a PDF library.

The image data processing unit 32 includes an image size acquisition unit 44, an image acquisition unit 46, and a page count acquisition unit 48.

The image size acquisition unit 44 acquires a horizontal direction length of the original image of the document data page. The image size acquisition unit 44 acquires a vertical direction length of the original image of the document data page.

The image acquisition unit 46 acquires the original image of the document data page.

The page count acquisition unit 48 acquires the number of document data pages.

The application unit 28 is application software such as iPrint, Colorio New Year's Card, and iProjection, for example.

Operation of Viewer

Figure 5:
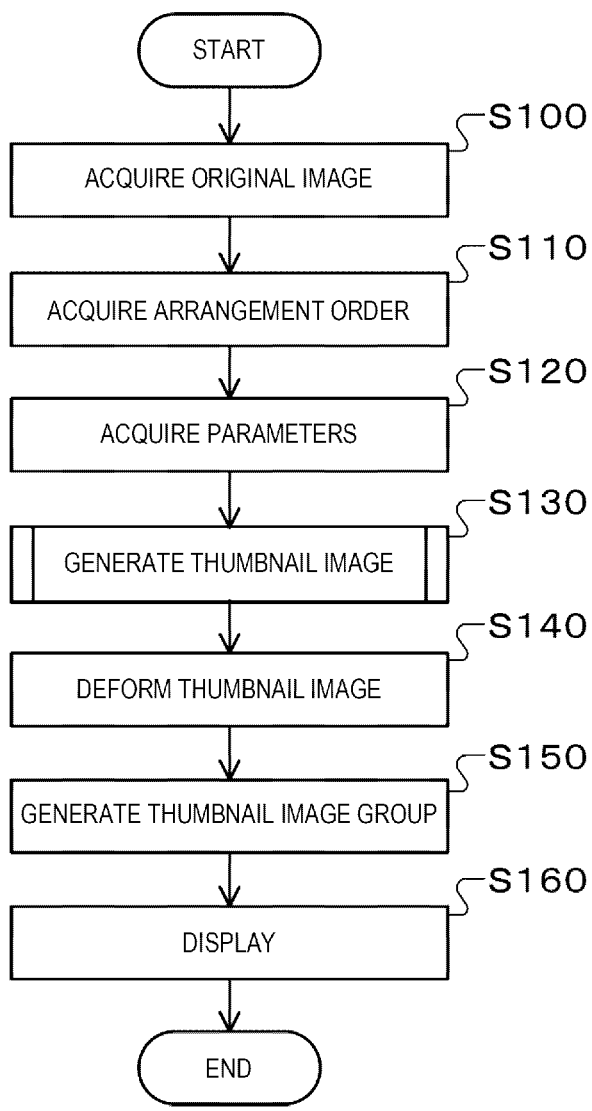
FIG. 5 is a flowchart showing an example of processing of the viewer.
Figure 6:
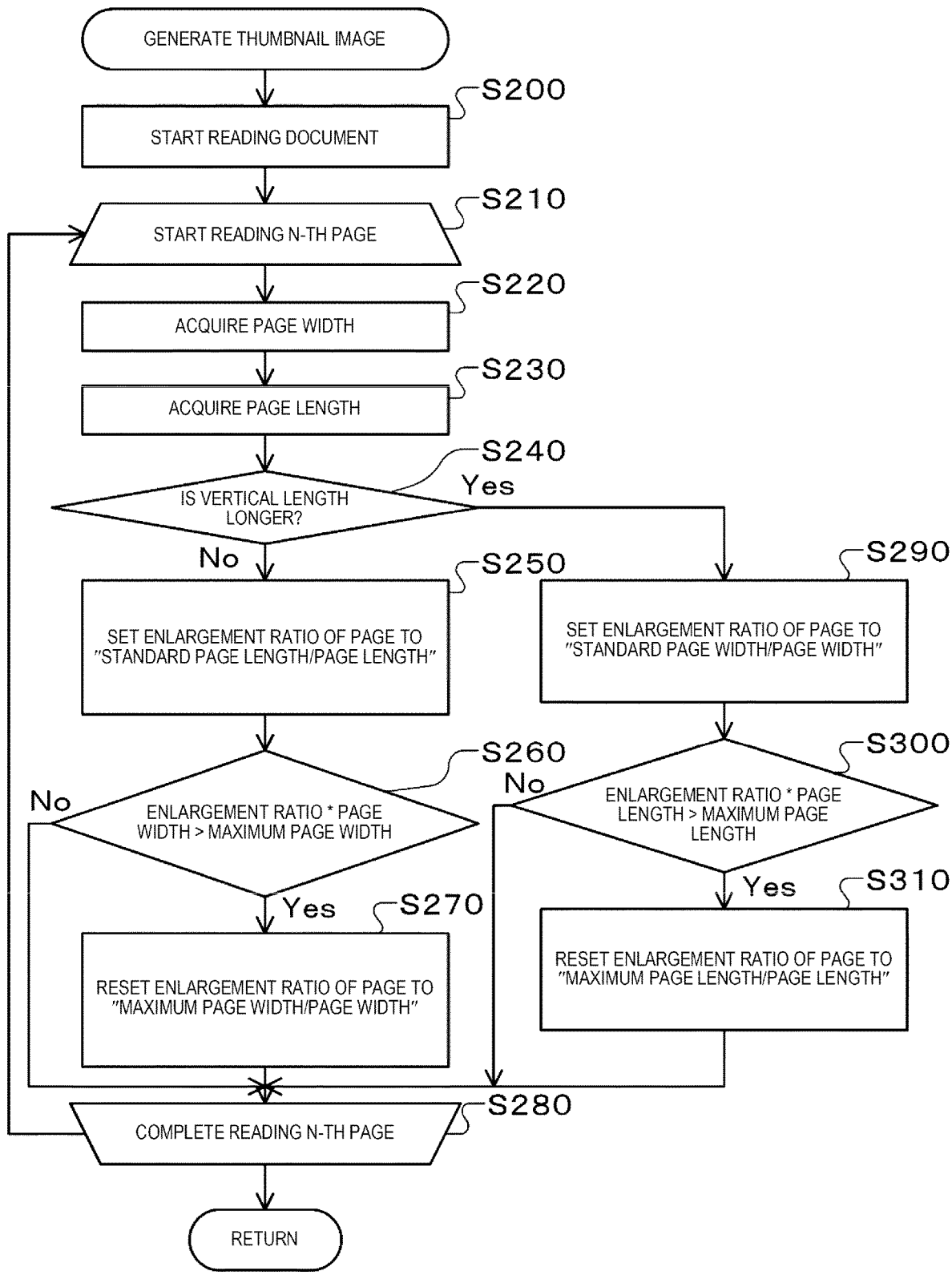
FIG. 6 is a flowchart showing an example of processing of the viewer.

FIGS. 5 and 6 are flowcharts showing an example of processing of the viewer 10, and the processing is the basic processing by the control unit 3. FIGS. 5 and 6 show a flow of enlarging or reducing a length so that the shorter length, of the vertical direction length and the horizontal direction length, is set to be constant, and a flow of applying a restriction when the longer length is longer than a predetermined maximum length. Hereinafter, the operation of the control unit 3 will be described with reference to FIG. 2 along the flowchart in FIG. 5.

The control unit 3 arranges the supplied page image P over the entire image display unit 2, and generates images in which the deformed thumbnail image group G is arranged on the bottom side of the page image P in an overlapped manner and in ascending order of page numbers from the right side to the left side of the image display unit 2.

The image arrangement unit 36 enlarges or reduces the thumbnail image T so that the shorter length, of the vertical and horizontal direction lengths of the thumbnail image T, is set to be constant size, in the thumbnail image group G in which the vertical and horizontal direction lengths of the thumbnail image T are mixed.

The image arrangement unit 36 enlarges or reduces the thumbnail image T so that the longer length, of the vertical and horizontal direction lengths of the thumbnail image T, is set to be constant size, in the thumbnail image group G in which the vertical and horizontal direction lengths of the thumbnail image T are mixed.

Hereinafter, based on the description in FIG. 2, it will be described that an image displayed in the page image display area D1 is specified as a page image P, and an image displayed in the thumbnail image display area D2 is specified as a thumbnail image T. However, the page image P and the thumbnail image T are not limited to this.

That is, in the viewer 10, one thumbnail image T1 is selected from the plurality of thumbnail images T by operating the buttons 7A to 7F or the touch panel 7G of the input unit 7. The viewer 10 displays a page image P corresponding to the selected thumbnail image T1 in the page image display area D1.

That is, a user operates the buttons 7A to 7F or the touch panel 7G to select a thumbnail image T1 indicating a desired page from a plurality of thumbnail images T displayed in the thumbnail image display area D2, and can visually recognize the desired page as the page image P displayed in the page image display area D1.

The flow in FIG. 5 is started when a predetermined event, for example, the viewer 10 is turned on or the viewer 10 is instructed to display a menu screen, for example.

First, in step S100, the control unit 3 acquires the thumbnail image group G to be processed, in this example, the original images of the plurality of thumbnail images T included in the thumbnail image group G. A plurality of original images are stored in the document storage unit 6.

Next, in step S110, the control unit 3 acquires data indicating an arrangement order of the plurality of thumbnail images T. The data includes an identifier of the thumbnail image T and a number indicating the arrangement order.

The data includes a number indicating the arrangement order of the thumbnail image T and a file name as an identifier of the thumbnail image T. The data is stored in the document storage unit 6. In step S100, the control unit 3 reads out the data from the document storage unit 6, and acquires an original image having a file name included in the data from the document storage unit 6. In step S110, the control unit 3 acquires the arrangement order of the thumbnail image T from the data.

Next, in step S120, the control unit 3 acquires parameters used for displaying the thumbnail image group G. These parameters are stored in the document storage unit 6 together with the identifier of the thumbnail image group G. The parameters acquired here include the number of images, a selected image, and a width. The number of images is a parameter indicating the number of thumbnail images T included in the thumbnail image group G. The selected image is a parameter for specifying the selected thumbnail image T among the thumbnail images T included in the thumbnail image group G. The width is a parameter indicating the horizontal direction length of the thumbnail image display area D2.

Next, in step S130, the control unit 3 generates a thumbnail image T. Specifically, the control unit 3 generates a thumbnail image T by reducing or enlarging the original image acquired in step S100.

Specifically, in the image arrangement unit 36, in the horizontal direction length or the vertical direction length of the thumbnail image T, when a ratio, of the horizontal direction length to the vertical direction length of the thumbnail image T, is within a predetermined range, a shorter length, of the horizontal direction length and the vertical direction length of the thumbnail image T, is set to be constant in the thumbnail image group G. The ratio, of the horizontal direction length to the vertical direction length of the thumbnail image T, is "vertical direction length/horizontal direction length", for example.

In the image arrangement unit 36, in the horizontal direction length or the vertical direction length of the thumbnail image T, when a ratio, of the horizontal direction length to the vertical direction length of the thumbnail image T, is outside the predetermined range, a longer length, of the horizontal direction length and the vertical direction length of the thumbnail image T, is set to be constant in the thumbnail image group G. The ratio, of the horizontal direction length to the vertical direction length of the thumbnail image T, is "vertical direction length/horizontal direction length", for example.

Hereinafter, the operation of generating a thumbnail image T of the control unit 3 will be described with reference to the flowchart in FIG. 6.

First, in step S200, a file instruction unit 42 instructs an image acquisition unit 46 to read out the original image specified by a user from the document storage unit 6 using the buttons 7A to 7F of the input unit 7 or the touch panel 7G.

Next, in step S210, the image acquisition unit 46 and the page count acquisition unit 48 start reading the n-th page of the original image. "n" is an integer of one or more.

Next, in step S220, the image size acquisition unit 44 acquires a length as a horizontal direction width of the original image. Various processing may be adopted to obtain the horizontal direction length of the original image. For example, one method for acquiring the horizontal direction length of the original image is to obtain the size information from the information header based on the image format (bitmap, JPEG, or the like) or document format (PDF, Word, or the like).

Next, in step S230, the image size acquisition unit 44 acquires a vertical direction length of the original image. The acquisition of the vertical direction length of the original image is based on the acquisition of the horizontal direction length of the original image as described above. In order to acquire the horizontal direction length and the vertical direction length of the original image, various size information calculation processing corresponding to various data formats may be adopted.

Next, in step S240, the image arrangement unit 36 determines whether the original image is long in the vertical direction. When the original image is long in the horizontal direction, or when the horizontal direction length and the vertical direction length of the original image are equal, "No" is determined and the process proceeds to step S250. When the original image is long in the vertical direction, "Yes" is determined and the process proceeds to step S290.

Next, in step S250, the image arrangement unit 36 sets the enlargement ratio of the original image to "vertical direction length of the standard page/vertical direction length of the page".

Next, in step S260, the image arrangement unit 36 determines whether the following expression is satisfied, enlargement ratio horizontal direction length of the page>horizontal direction length of the maximum page". When the enlargement ratio horizontal direction length of the page>horizontal direction length of the maximum page" is satisfied, "Yes" is determined and the process proceeds to step S270. When the "enlargement ratio horizontal direction length of the page horizontal direction length of the maximum page" is satisfied, "No" is determined and the process proceeds to step S280.

The maximum page in a horizontally long mode is set to a page, where the horizontal direction length is longer than the horizontal direction length of the standard page and the vertical direction length is equal to the vertical direction length of the standard page. For example, the horizontal direction length of the maximum page in a horizontally long mode is set to √2 times the horizontal direction length of the standard page.

Next, in step S270, the image arrangement unit 36 resets the enlargement ratio of the original image to "horizontal direction length of the maximum page/horizontal direction length of the page".

Next, in step S280, a file instruction unit 42 completes the reading of the n-th page of the original image.

Next, in step S290, the image arrangement unit 36 sets the enlargement ratio of the original image to "horizontal direction length of the standard page/horizontal direction length of the page".

Next, in step S300, the image arrangement unit 36 determines whether the following expression is satisfied, "enlargement ratio*vertical direction length of the page>vertical direction length of the maximum page". When the "enlargement ratio*vertical direction length of the page>vertical direction length of the maximum page" is satisfied, "Yes" is determined and the process proceeds to step S310. When the "enlargement ratio*vertical direction length of the page vertical direction length of the maximum page" is satisfied, "No" is determined and the process proceeds to step S280.

The maximum page in a vertically long mode is set to a page, where the horizontal direction length is equal to the horizontal direction length of the standard page and the vertical direction length is longer than the vertical direction length of the standard page. For example, the vertical direction length of the maximum page in a vertically long mode is set to 2 times the vertical direction length of the standard page.

It is desirable that the maximum page in a horizontally long mode and the maximum page in a vertically long mode are set to have different sizes from each other. Since the horizontal direction length of the page is the same as the direction in which the thumbnail images T are arranged, the thumbnail images need to be densely arranged, so there is less margin than in the vertical direction. That is, it is desirable that the horizontal direction length of the maximum page in a horizontally long mode is set shorter than the vertical direction length of the maximum page in a vertically long mode.

Next, in step S310, the image arrangement unit 36 resets the enlargement ratio of the original image to "vertical direction length of the maximum page/vertical direction length of the page".

Thereafter, a thumbnail image T, which is obtained by reducing or enlarging the original image at an enlargement ratio obtained from above, is generated. The control unit 3 stores the generated thumbnail image T in the RAM 5.

Refer to FIG. 5 again.

Next, in step S140, the control unit 3 deforms a thumbnail image T. The GUI base unit 30 causes each of the plurality of thumbnail images T arranged on the first virtual rotation axis Q to rotate about each second virtual rotation axis M intersecting the first virtual rotation axis Q and further to rotate about the first virtual rotation axis Q, and then generates the thumbnail images T.

FIGS. 7A to 7E are diagrams for explaining deformation processing of the thumbnail image T.

The generated thumbnail image T is an image of the original image in plan view. Hereinafter, this state is referred to as "reference state". The thumbnail image T is deformed from the reference state to a state where it is viewed from a certain viewpoint and rotated around a certain rotation axis.

Figure 7A:
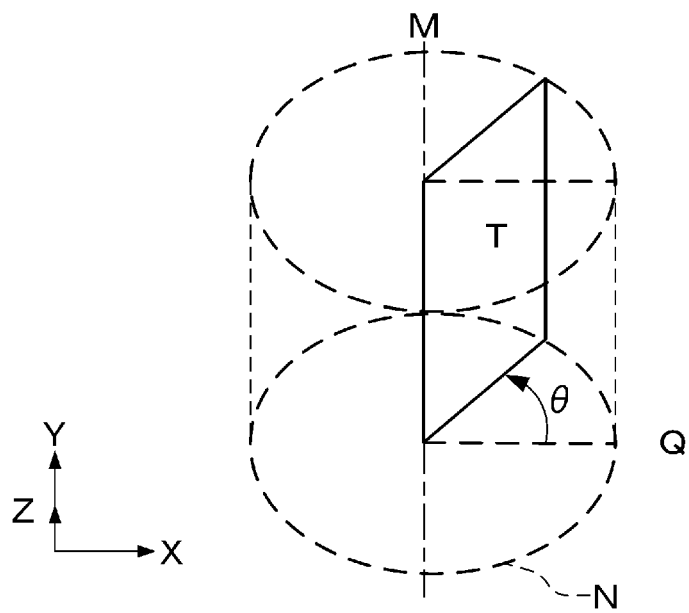
FIG. 7A is a diagram for explaining deformation processing of a thumbnail image.

FIG. 7A is a diagram showing a thumbnail image T after a deformation.

The thumbnail image T is displayed on a first virtual rotation axis Q in the horizontal direction. The thumbnail image T after the deformation is displayed by being rotated around a second virtual rotation axis M in the vertical direction intersecting the first virtual rotation axis Q. In other words, it is an image where the thumbnail image T before deformation is set on the horizontal plane N in a virtual space and is rotated from the reference state by the rotation angle θ around the second virtual rotation axis M. In this example, it is the left side of the thumbnail image T before deformation.

The thumbnail image T after the deformation is displayed by being rotated about the first virtual rotation axis Q. In other words, the angle of the horizontal plane N depends on a depression angle ϕ (not shown) when the thumbnail image T is viewed from a viewpoint above the upper side of the thumbnail image T in the virtual space. For example, when viewed from directly above the upper side of the thumbnail image T in the virtual space, an ellipse indicated by a broken line becomes a perfect circle, and the ellipse gradually becomes flat as the viewpoint goes down. The angle of the horizontal plane N is the deviation of the ellipse indicated by the broken line in the figure from the perfect circle.

Specifically, the deformation of the thumbnail image T is performed as follows, for example.

Figure 7B:
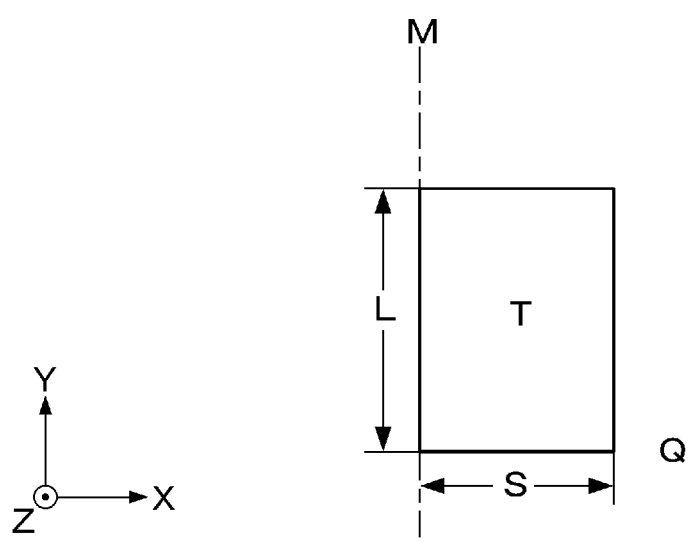
FIG. 7B is a diagram for explaining deformation processing of a thumbnail image.

FIG. 7B is a diagram showing the thumbnail image T in the reference state.

The thumbnail image T in the reference state is a quadrangle having a vertical direction length L and a horizontal direction length S. In the thumbnail image T in the reference state, a vertical direction side is parallel to the vertical direction of the display area, and the horizontal direction side is parallel to the horizontal direction of the display area.

Figure 7C:
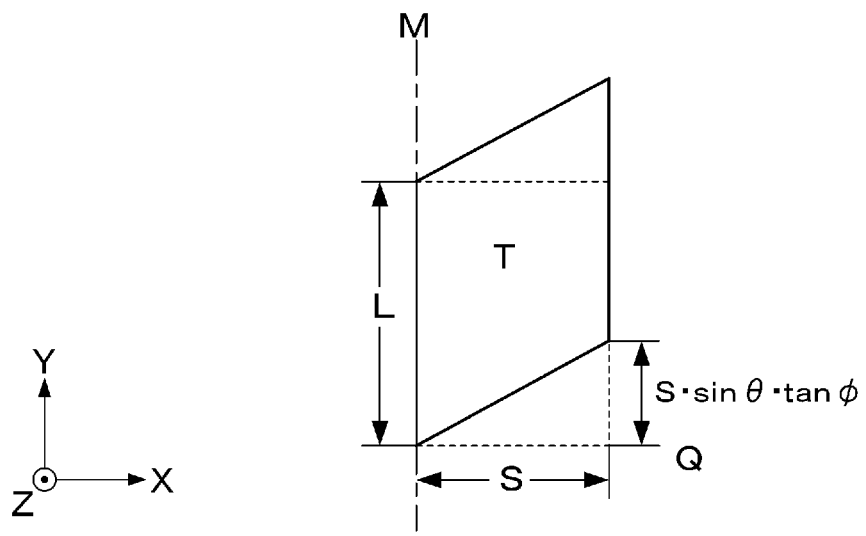
FIG. 7C is a diagram for explaining deformation processing of a thumbnail image.

As shown in FIG. 7C, the control unit 3 applies a vertical direction deformation with respect to the thumbnail image T in the reference state while maintaining the horizontal direction length, and the right side is shifted to the left side by $S \cdot \sin\theta \cdot \tan\phi$.

Figure 7D:
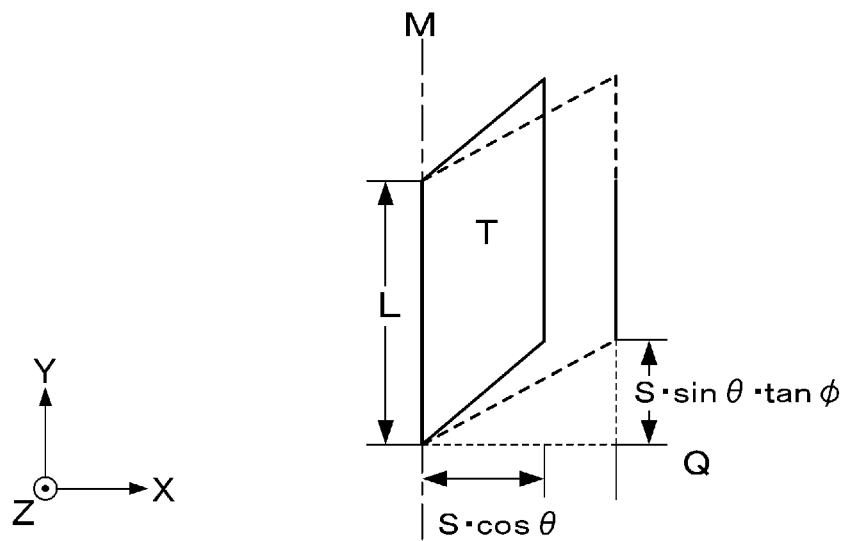
FIG. 7D is a diagram for explaining deformation processing of a thumbnail image.
Figure 7E:
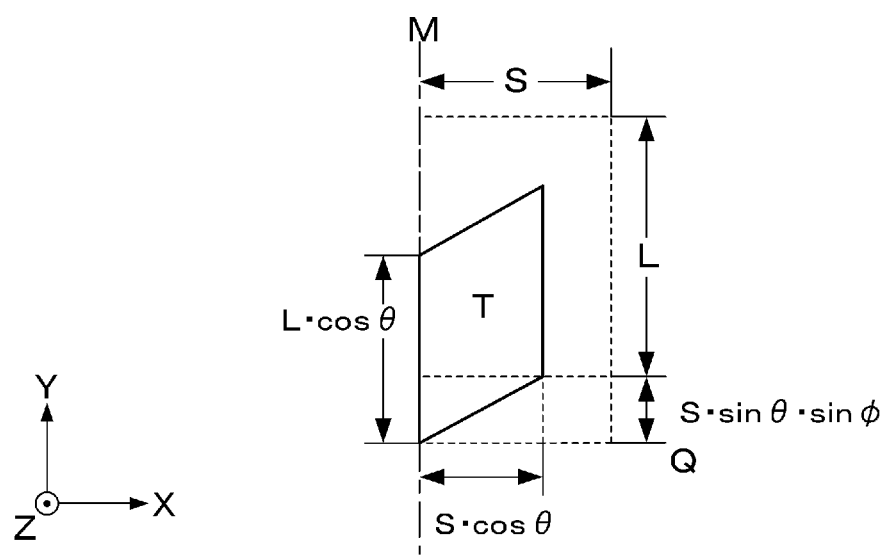
FIG. 7E is a diagram for explaining deformation processing of a thumbnail image.

Next, as shown in FIG. 7D, the control unit 3 reduces the thumbnail image T in the horizontal direction at a magnification of $\cos\theta$.

At the last, as shown in FIG. 7E, the control unit 3 reduces the thumbnail image T in the vertical direction at a magnification of $\cos\theta$.

The thumbnail image T after the deformation is a parallelogram having a vertical direction length $L \cdot \cos\phi$ and a horizontal direction length $S \cdot \cos\theta$, and the right side and the left side are shifted by $S \cdot \sin\theta \cdot \sin\phi$.

In this example, the deformation of the thumbnail image T is characterized by two parameters, a rotation angle θ and a depression angle ϕ. In order to simplify the explanation, a case where the rotation angle θ and the depression angle ϕ are constant will be described as an example.

Refer to FIG. 5 again.

Next, in step S150, the control unit 3 generates a thumbnail image group G. The thumbnail image group G is an image obtained by combining a plurality of thumbnail images T. In the thumbnail image group G, the plurality of thumbnail images T partially overlap at least two thumbnail images T among the plurality of thumbnail images T. In this example, the plurality of thumbnail images T are arranged such that upper ends are in contact with one horizontal straight line. The plurality of thumbnail images T are arranged according to the order indicated by the data acquired in step S110, for example, the plurality of thumbnail images T are arranged such that the left end is the first image and the right end is the last image.

Next, in step S160, the control unit 3 displays the generated thumbnail image group G on the image display unit 2. The position of a representative point where the thumbnail image group G is displayed is determined in advance. The representative point of the thumbnail image group G is, for example, an upper left vertex of a circumscribed rectangle of the thumbnail image group G. The side of the circumscribed rectangle is parallel to the side of the display area. In this way, the screen in FIG. 2 is displayed.

FIG. 8A is a diagram for explaining a thumbnail image group G that fits within a predetermined range of aspect ratio.

In the image arrangement unit 36, as shown in FIG. 8A, when the ratio of the horizontal direction length to the vertical direction length of the thumbnail image T is within a predetermined range of the aspect ratio, the thumbnail image is processed so as to fit in the thumbnail image display area D2.

The image arrangement unit 36 specifies the thumbnail image display area D2 in which the thumbnail image group G having an aspect ratio within the predetermined range fits. Although the aspect ratio may differ for each thumbnail image T, such as a photograph, if the aspect ratio is within a predetermined range the thumbnail image group G fits the thumbnail image display area D2. That is, the size of the thumbnail image T of the standard page is determined so that the thumbnail image having an aspect ratio in a predetermined range when the rotation angle θ becomes maximum, does not exceed the vertical direction length of the thumbnail image display area D2. That is, the vertical direction length L and the horizontal direction length S of the standard page are set so that the vertical direction length of D2 is equal to "L·cos ϕ+S·sin θ·sin ϕ" when the rotation angle θ becomes maximum as shown in FIG. 7E. Thereby, the thumbnail images T are arranged so that the thumbnail images T of the standard page set as the standard aspect ratio fit in the thumbnail image display area D2.

FIG. 8B is a diagram for explaining the thumbnail image group G including thumbnail images T that deviate from the predetermined aspect ratio.

As shown in FIG. 8B, the thumbnail image T, that is long in the vertical direction and deviates from the aspect ratio of the predetermined range, protrudes outside. Further, the thumbnail image T that is long in the vertical direction and deviates from the aspect ratio in the predetermined range, is retracted in the depth direction. In other words, since the vertical direction length of the maximum page in a vertically long mode is longer than the vertical direction length of D2, when the aspect ratio of the thumbnail image T exceeds the aspect ratio of the predetermined range, the thumbnail image T is displayed beyond the range of D2. According to this, even when the thumbnail image T that is long in the horizontal direction and the thumbnail image T that is long in the vertical direction are mixed in the thumbnail image group G, since the vertically long thumbnail images T protrude and the parts, where images overlap with each other and hide, are reduced, a user can easily discriminate the description content of the thumbnail images T while checking a large number of thumbnail images T in a list display.

Figure 9:
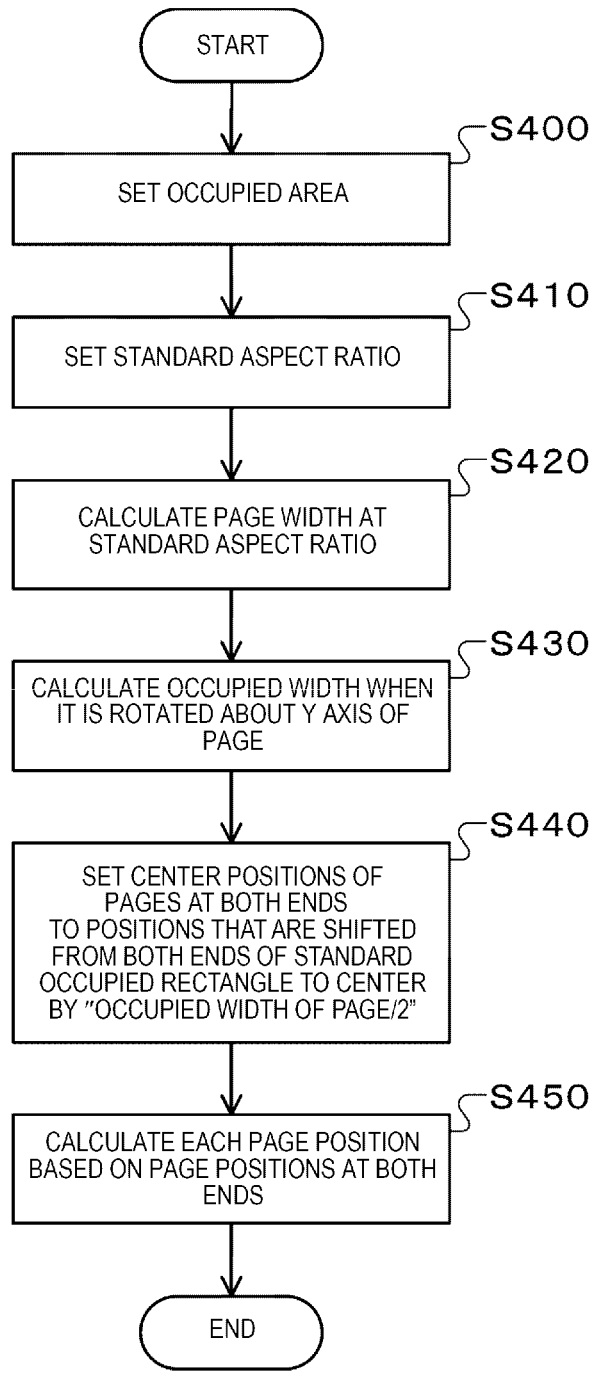
FIG. 9 is a flowchart showing an example of processing of the viewer.
Figure 10A:
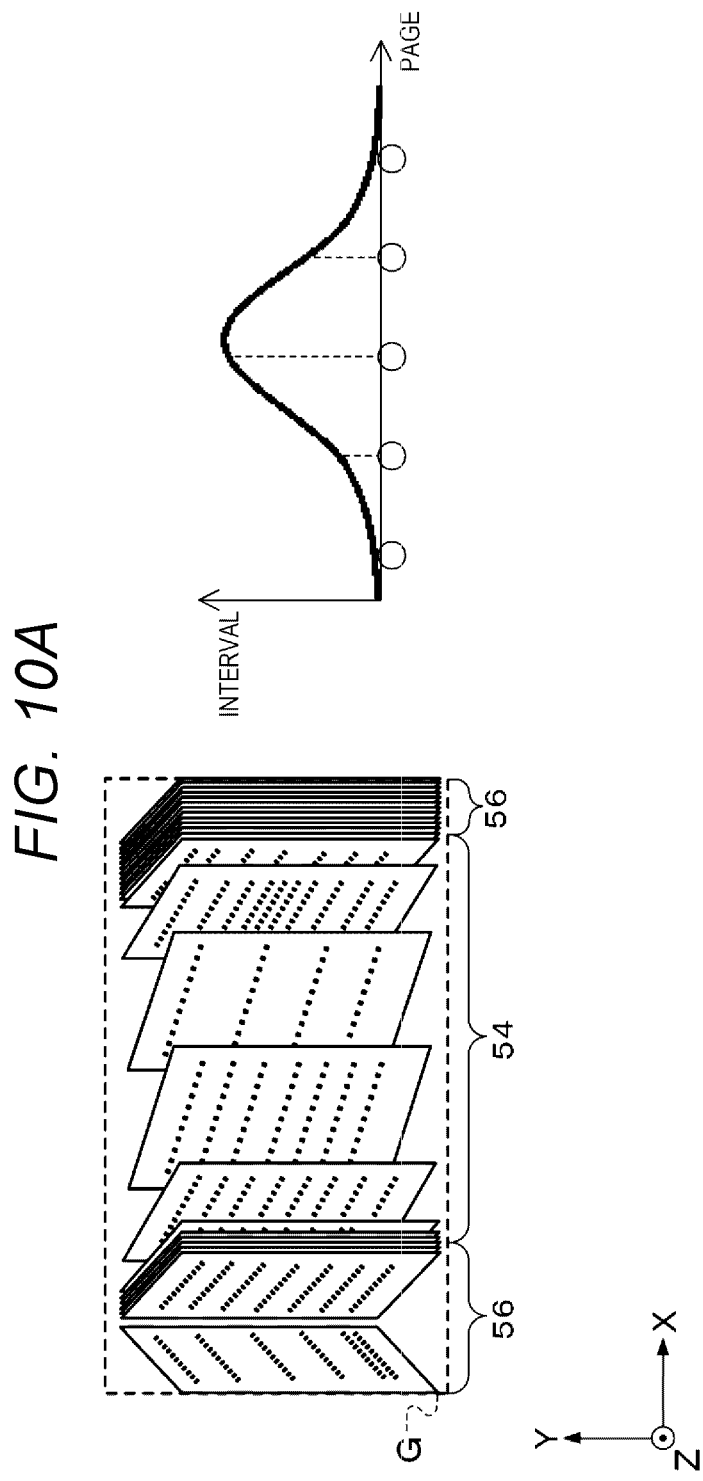
FIG. 10A is a diagram for explaining normal distribution area adjustment when the thumbnail image that is long in the vertical direction and the thumbnail image that is long in the horizontal direction are mixed.

FIG. 9 is a flowchart showing an example of processing of the viewer 10, and shows a flow of arranging the thumbnail images T by specifying a standard aspect ratio by the control unit 3. FIGS. 10A to 10C are diagrams for explaining normal distribution area adjustment when a thumbnail image T that is long in the vertical direction and a thumbnail image T that is long in the horizontal direction are mixed. Hereinafter, an operation of the control unit 3 will be described with reference to FIGS. 10A to 10C along the flowchart in FIG. 9. Therefore, FIGS. 10A to 10C will be described first.

The thumbnail image group G includes an intermediate portion 54 and side portions 56 pinching the intermediate portion 54. The intermediate portion 54 is an area where an interval between the thumbnail images T varies, and the side portion 56 is an area where an interval between the thumbnail images T is fixed at a minimum. The side portion 56 may be at both ends of the intermediate portion 54 or may be only one side. In the arrangement of the plurality of thumbnail images T, if the thumbnail image T that is long in the vertical direction and the thumbnail image T that is long in the horizontal direction are mixed in the intermediate portion 54, when the intervals are adjusted to the thumbnail images T that are long in the vertical direction, the overlaps of the thumbnail images T that are long in the horizontal direction become too large, and when the intervals are adjusted to the thumbnail images T that are long in the horizontal direction, gaps are created in the intervals of the thumbnail images T that are long in the vertical direction.

In the arrangement of the plurality of thumbnail images T, a comparison is made between the number of thumbnail images T that are long in the vertical direction and the number of thumbnail images T that are long in the horizontal direction, which are displayed in the intermediate portion 54, and the interval is adjusted to the larger number. That is, the interval between thumbnail images T is set wider, when the number of thumbnail images T that are long in the vertical direction is smaller than the number of thumbnail images T that are long in the horizontal direction, which are displayed in the intermediate portion 54, as compared with when the number of thumbnail images T that are long in the vertical direction is larger than the number of thumbnail images T that are long in the horizontal direction, which are displayed in the intermediate portion 54.

Further, as for the arrangement of the plurality of thumbnail images T, there is a case where it is desired to use a gap between the thumbnail images adjacent to each other with some trace, such as attaching a sticky note or the like to the thumbnail image T. In such a case, if the number of thumbnail images T that are long in the vertical direction is half or substantially up to 30% with respect to the number of thumbnail images T that are long in the horizontal direction, which are displayed in the intermediate portion 54, the interval may be set to the interval of thumbnail images T that are long in the horizontal direction.

The arrangement when arranging a plurality of thumbnail images T in the intermediate portion 54 is as follows. The interval increases from the end page of the intermediate portion 54 toward the center page, and the intervals are distributed and arranged at a ratio based on a normal distribution in which the interval is maximum on the center page. Further, the spread of the normal distribution of page positions and intervals applied to the arrangement of the intermediate portion 54 is narrowed based on the horizontal direction length of the thumbnail image T that is long in the horizontal direction and included in the intermediate portion 54, and the coefficient corresponding to the page position. The normal distribution can reduce the load on the CPU for each drawing by calculating in advance and creating a table.

The arrangement of the plurality of thumbnail images T has a distribution like a normal distribution only in the intermediate portion 54, and the other side portions 56 are arranged at equal intervals. Regarding the arrangement of the plurality of thumbnail images T, the occupation area ratio of the side portion 56 to the intermediate portion 54 is determined in advance.

Since the side portion 56 is fixed as image information without change, it can be reused when rendering the next frame. If the side portion 56 is divided into "n" for each page, even when the thumbnail image T1 changes greatly, it can be partially reused until the page reaches the intermediate portion 54 in order from the back of the page.

As shown in FIG. 10A, as a basic arrangement regardless of the aspect ratio of the thumbnail image T, the image arrangement unit 36 arranges and displays a plurality of thumbnail images T in the horizontal direction based on the page order, and the interval between the adjacent thumbnail images T, which are displayed in the intermediate portion 54 in the horizontal direction, is desirably larger than the interval between the adjacent thumbnail images T, which are respectively displayed in the side portions 56 pinching the intermediate portion 54. According to this, a user can easily discriminate the description content of the thumbnail images T while checking a large number of thumbnail images T in a list display.

A graph in FIG. 10A shows a relationship between the page in the intermediate portion 54 and the ratio of the intervals at which the thumbnail images T are arranged. The graph has a distribution like a normal distribution in which the interval ratio has a peak as it goes from the end page to the center page in the intermediate portion 54. The image arrangement unit 36 calculates an interval for each page by distributing the width of the intermediate portion 54 at a ratio of the interval for each page.

Further, as shown in FIG. 10B, in the intermediate portion 54 of the thumbnail image group G, the image arrangement unit 36 makes the normal distribution, which represents a distribution of the ratio of the page of the thumbnail image T to the interval, steep when there are more thumbnail images T that are long in the horizontal direction than thumbnail images T that are long in the vertical direction, as compared with when there are more thumbnail images T that are long in the vertical direction. When the normal distribution of the interval ratio becomes steep, the distribution of the interval is concentrated on pages positioned near the center of the intermediate portion 54, and as a result, the interval becomes wider. Note that the amount, where the distribution of the normal distribution of intervals is narrowed, is calculated based on the relationship of the normal distribution between the narrowing amount and the page. Reference numerals "a" to "e" correspond to the page positions of thumbnail images T that are long in the horizontal direction in the thumbnail image group G. A total amount obtained by multiplying the amount, where the page position of each of the reference numerals "a" to "e" is narrowed, and the horizontal direction length of the thumbnail image T is set as a narrowing amount. That is, the narrowing amount becomes larger as the number of thumbnail images T that are long in the horizontal direction increases and as the page position of the thumbnail image T that is long in the horizontal direction is shifted to the center.

Further, as shown in FIG. 10C, in the intermediate portion 54 of the thumbnail image group G, the image arrangement unit 36 makes the normal distribution, which represents a distribution of the ratio of the page of the thumbnail image T to the interval, smooth when there are fewer thumbnail images T that are long in the horizontal direction than thumbnail images T that are long in the vertical direction, as compared with when there are fewer thumbnail images T that are long in the vertical direction. When the normal distribution of the interval ratio becomes smooth, the distribution of the intervals is dispersed from the center of the intermediate portion 54 to the page positioned in a wide range, and as a result, the intervals are narrowed. Note that the reference numerals "f" and "g" correspond to the page positions of thumbnail images T that are long in the horizontal direction in the thumbnail image group G. The reference numerals "f" and "g" are pages positioned in the end side of the intermediate portion 54, and the number of pages is also small. Therefore, the calculated total narrowing amount is smaller than in the case of FIG. 10B. That is, the narrowing amount becomes smaller as the number of thumbnail images T that are long in the horizontal direction decreases and as the page position of the thumbnail image T that is long in the horizontal direction is shifted to the end.

Next, an operation of the control unit 3 will be described along the flowchart in FIG. 9.

First, in step S400, the effective rectangle processing unit 34 sets a thumbnail image display area D2 as an occupied area.

Next, in step S410, the image arrangement unit 36 sets a standard aspect ratio.

Next, in step S420, the image arrangement unit 36 calculates the horizontal direction length of the thumbnail image T at the standard aspect ratio.

Next, in step S430, the image arrangement unit 36 calculates the horizontal direction length of the thumbnail image T when it is rotated about the second virtual rotation axis M.

Next, in step S440, the image arrangement unit 36 sets the center positions of the thumbnail images T at both ends to positions that are shifted from the both ends of the thumbnail image display area D2 to the center by "horizontal direction length/2" of the thumbnail image T.

Next, in step S450, the image arrangement unit 36 calculates a position of each thumbnail image T based on the positions of the thumbnail images T at both ends.

FIGS. 11A and 11B are diagrams for explaining the arrangement of the thumbnail images T when apart of the display area of the thumbnail image group G deviates from the image display unit 2.

When the display area in which the thumbnail image group G is displayed is below a predetermined value, the image arrangement unit 36 performs processing so that either one of the both end portions, that face each other in the vertical direction, of the plurality of thumbnail images T is aligned and displayed. In other words, normally, the vertical direction is center aligned and both ends are displayed, but when the display area where the thumbnail image group G is displayed is below the predetermined value, either one of both end portions, that face each other in the vertical direction, of the plurality of thumbnail images T is hidden and not displayed. Therefore, by aligning and displaying the other end portion, a user can easily discriminate the description content of the thumbnail images T while checking a large number of thumbnail images T in a list display.

When the display area of the thumbnail image group G deviates from the predetermined value on the bottom side of the image display unit 2, the image arrangement unit 36 performs top alignment processing for aligning the upper ends of the thumbnail images T. When the display area of the thumbnail image group G is below the predetermined value, the image arrangement unit 36 performs the top alignment processing for aligning the upper ends of the thumbnail images T in an image coordinate system. Further, the image arrangement unit 36 performs processing of shifting the thumbnail images T into the display area to be displayed when not all of the plurality of thumbnail images T are displayed but only a part is displayed.

In FIG. 11A, for the thumbnail image group G, only the upper portion that is a predetermined range from the upper end of the thumbnail image T is displayed, and the lower portion below the upper portion is not displayed. The thumbnail image group G is normally displayed with the vertical direction being center aligned, but when a part of the display area of the thumbnail image group G deviates from the image display unit 2, the thumbnail image T is shifted to the bottom side and hidden, and is difficult to visually recognize.

In FIG. 11B, when a part of the display area of the thumbnail image group G deviates from the image display unit 2, the thumbnail images T are top aligned. In the thumbnail image group G, when a part of the display area of the thumbnail image group G deviates from the image display unit 2 with the thumbnail images are center aligned in the vertical direction, the display area of the thumbnail image T that is long in the horizontal direction becomes smaller than the display area of the thumbnail image T that is long in the vertical direction. Therefore, when a part of the display area of the thumbnail image group G deviates from the image display unit 2, the thumbnail images T are aligned with the top alignment. For example, in the thumbnail image group G, from the time when the lower ends of the thumbnail images T begin to come out of the display area of the image display unit 2, the thumbnail images T gradually shifting up with the default vertical/horizontal ratio, and when the thumbnail images T are hidden by more than half the height or area, the thumbnail images T are top aligned. Note that the horizontal direction length of the thumbnail image T may be set to be constant only when a part of the display area of the thumbnail image group G deviates from the image display unit 2 to the bottom side.

As the control unit 3 executes the above steps based on the program stored in the ROM, a page image P is displayed in the page image display area D1, and thumbnail images T adjacent to each other are arranged so as to partially overlap with each other in the thumbnail image display area D2 based on the page order of page images P.

According to the present embodiment, when the thumbnail image T is displayed, the shorter length, of the horizontal direction length and the vertical direction length of the thumbnail image T, is set to be constant in the thumbnail image group G. Alternatively, the longer length, of the horizontal direction length and the vertical direction length of the thumbnail image T, is set to be constant in the thumbnail image group G. Thereby, even when the thumbnail image T that is long in the vertical direction and the thumbnail image T that is long in the horizontal direction are mixed in the thumbnail image group G, since the space between the thumbnail images T is narrowed, the thumbnail images T can be arranged while maintaining the relevance between the thumbnail images T in a narrow space between the thumbnail images T. As a result, browsing becomes easy.

Further, since the page image P is displayed in the page image display area D1, and the thumbnail images T are displayed in the thumbnail image display area D2, a user can edit the page image P while checking the configuration of the entire document with the thumbnail images T.

Note that the embodiment is not limited above, and it can also implement with the following forms.

Modification Example 1

The sizes of the reduced thumbnail image T and the page image P may be set to any size by a user from the input unit 7 so that the user can easily see. Thereby, since each of a plurality of users can set the sizes of the reduced thumbnail image T and the page image P, convenience when the plurality of users use the viewer 10 is improved.

Modification Example 2

The documents stored in the document storage unit 6 may be not only electronic manuals or electronic books stored in advance, but also evaluation data or schedules that are input and accumulated in the viewer 10 by a user.

Modification Example 3

The arrangement of the thumbnail images T in the thumbnail image group G is not limited to that described in the embodiment. The thumbnail images T may be arranged in descending order of page numbers from the right side to the left side of the display area. Further, two thumbnail images T adjacent to each other may not have the same upper end or lower end position. The thumbnail images T displayed on the left side of the thumbnail image T1 may be shifted to the top side as the distance from the thumbnail image T1 increases. The thumbnail images T displayed on the right side of a thumbnail image T which is one page before the thumbnail image T1 may be shifted to the top side as the distance from the thumbnail image T which is one page before the thumbnail image T1 increases.

Modification Example 4

The deformation of the thumbnail image T is not limited to that described in the embodiment. For example, the rotation angle θ may be constant regardless of the selection page. Further, the depression angle ϕ may be "zero" that does not look down, or "minus" looking up from below.

Second Embodiment

Figure 12:
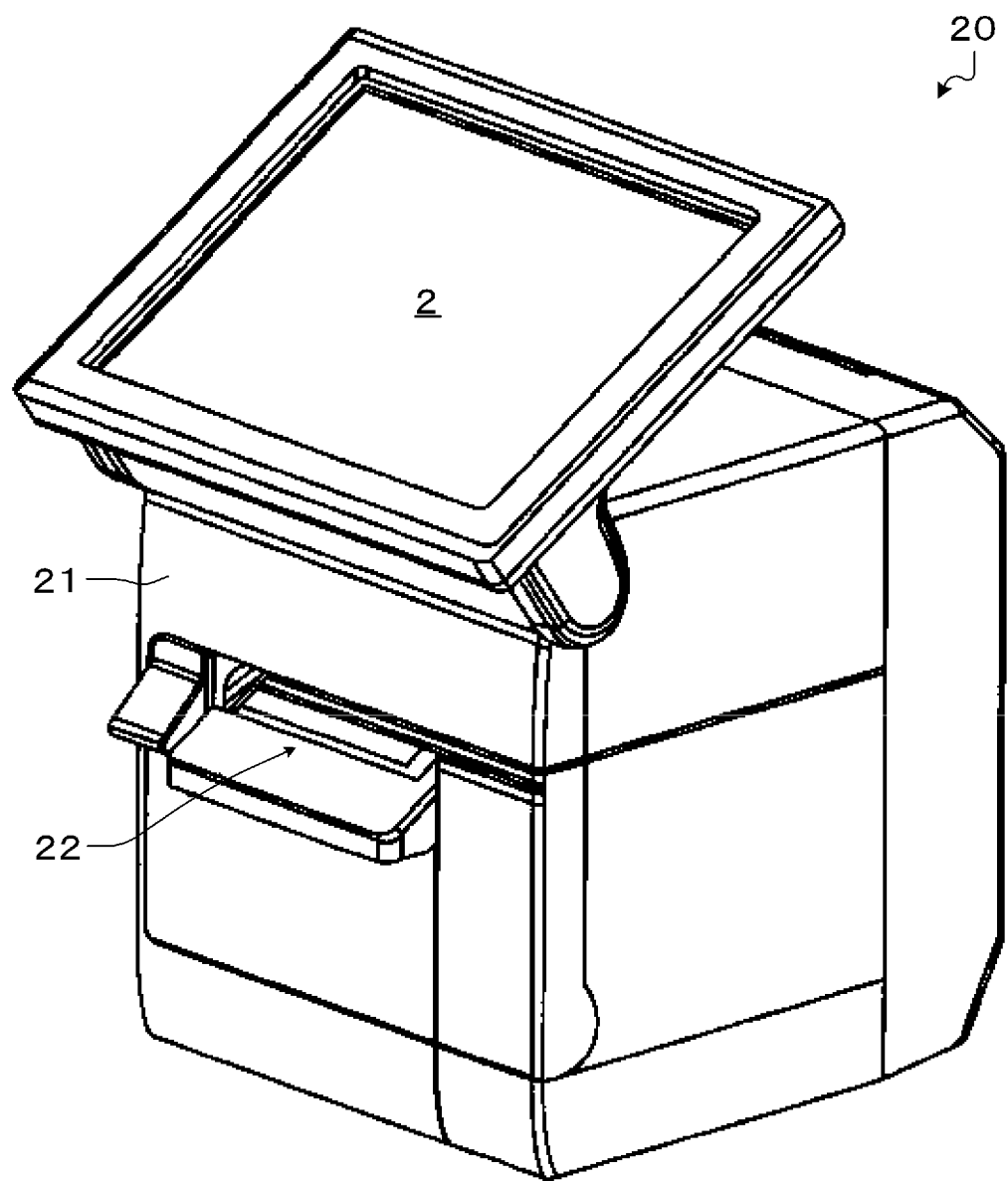
FIG. 12 is a diagram showing an appearance of a printer according to a second embodiment.

FIG. 12 is a diagram showing an appearance of a printer 20 as a display apparatus according to the present embodiment.

As shown in FIG. 12, the printer 20 includes an image display unit 2, a case 21, and a printing medium discharge unit 22.

The image display unit 2 displays an image, includes a pressure-sensitive touch panel 7G having optical transparency, and functions as the input unit 7.

The printer 20 includes a printing function, a roll-shaped printing medium, and a printing mechanism control unit in the case 21, and also includes an interface that receives print data from an external device. The printer 20 further includes the image display unit 2, the control unit 3, the VRAM 4, the RAM 5, the document storage unit 6, and the input unit 7 shown in FIG. 3. The printer 20 controls the printing mechanism by the printing mechanism control unit, prints print data on the internal printing medium, and discharges the printed printing medium from the printing medium discharge unit 22.

The image display unit 2 displays print data, which is received from an external device and stored in the document storage unit 6, an electronic manual or an electronic book stored in the document storage unit 6, or a document created by a user.

Therefore, according to the present embodiment, the user can perform printing after editing the page image P to be printed while checking a large number of thumbnail images T in a list display, thereby preventing erroneous printing.

In the present embodiment, the display apparatus is not limited to the viewer 10 or the printer 20, but may be an electronic book reader, a personal computer, a personal digital assistant (PDA), a smartphone, or the like.

When a page image P and thumbnail images T of an electronic book is displayed on a personal computer, PDA, or smartphone, by installing a program for realizing the control unit 3 shown in FIG. 3 and executing the program, the page image P and the thumbnail images T of the electronic book are displayed.

Note that the program may be provided in a state stored in a computer-readable recording medium such as a magnetic recording media (magnetic tape, magnetic disk (HDD (Hard Disk Drive), FD (Flexible Disk)), or the like), an optical recording medium (optical disc (CD (Compact Disc), DVD (Digital Versatile Disk)), or the like), a magnetic optical recording media, or a semiconductor memory, and installed in the display apparatus 10 or 20. Further, the program may be downloaded and installed in the display apparatus 10 or 20 via a communication line.

Further, the image display unit 2 included in the display apparatus 10 and 20 is not limited to a liquid crystal display, but may be other display devices such as an electrophoretic display device using microcapsules and an organic electro luminescence (EL) display.

Hereinafter, the content derived from the embodiments will be described.

Provided is a display method in which each of a plurality of images arranged on a first virtual axis is rotated about each of second virtual axes intersecting the first virtual axis and further rotated about the first virtual axis, and an image group arranged side by side in a first direction is displayed on a display unit, in which in a length of the image in the first direction or a length of the image in a second direction which intersects the first direction, when a ratio, of the length of the image in the first direction to the length of the image in the second direction, is within a predetermined range, a shorter length, of the length of the image in the first direction and the length of the image in the second direction, is set to be constant in the image group, and when the ratio, of the length of the image in the first direction to the length of the image in the second direction, is outside the predetermined range, a longer length, of the length of the image in the first direction and the length of the image in the second direction, is set to be constant in the image group.

According to this, when the image is displayed, the shorter length, of the length of the image in the first direction and the length of the image in the second direction, is set to be constant in the image group. Alternatively, the longer length, of the length of the image in the first direction and the length of the image in the second direction, is set to be constant in the image group. Thereby, even when an image longer in the first direction and an image longer in the second direction are mixed in the image group, since a space between the images becomes narrow, the images can be arranged while maintaining the relationship between the images in a narrow space between the images. As a result, browsing becomes easy.

In the above display method, the predetermined range may be a range of $1/\sqrt{2}$ or more and $\sqrt{2}$ or less.

According to this, it is possible to arrange the balanced images in the entire image group.

In the above display method, the longer length, of the length of the image in the first direction and the length of the image in the second direction, may be set to a predetermined value.

According to this, it is possible to prevent the longer length of the thumbnail image T from exceeding the limit length of an image that is long in the second direction and the limit length of an image that is long in the first direction. As a result, a user can easily discriminate the description content of the images while checking a large number of images in a list display.

In the above display method, the image may be displayed to fit in an occupied area with the ratio, of the length of the image in the first direction to the length of the image in the second direction, as a predetermined aspect ratio.

According to this, even when the image that is long in the first direction and the image that is long in the second direction are mixed in the image group, a user can easily discriminate the description content of the images while checking a large number of images in a list display.

In the display method, in the image group, when there are more images that are longer in the first direction than the second direction than the images that are longer in the second direction than the first direction, each interval between the images may be displayed wider than when there are more images that are longer in the second direction than the first direction.

According to this, even when the image that is long in the second direction and the image that is long in the first direction are mixed in the image group, a user can easily discriminate the description content of the images while checking a large number of images in a list display.

In the above display method, when the display area in which the image group is displayed is below a predetermined value, it is desirable that either one of the both end portions, that face each other in the second direction, of a plurality of the images is aligned and displayed.

According to this, normally, the vertical direction is center aligned and displayed, but when the display area where the image group is displayed is below a predetermined value, either one of both end portions, that face each other in the second direction, of the plurality of images is aligned and displayed, so that a user can easily discriminate the description content of the images while checking a large number of images in a list display.

Provided is a display apparatus including: a display unit displaying an image group in which a plurality of images are arranged in a first direction; and an image generation unit generating the images in which each of a plurality of the images arranged on a first virtual axis is rotated about each of second virtual axes intersecting the first virtual axis and further rotated about the first virtual axis, in which the image generation unit has a setting unit in which in a length of the image in the first direction or a length of the image in a second direction which intersects the first direction, when a ratio, of the length of the image in the first direction to the length of the image in the second direction, is within a predetermined range, a shorter length, of the length of the image in the first direction and the length of the image in the second direction, is set to be constant in the image group, and when the ratio, of the length of the image in the first direction to the length of the image in the second direction, is outside the predetermined range, a longer length, of the length of the image in the first direction and the length of the image in the second direction, is set to be constant in the image group.

According to this, when the image is displayed, the shorter length, of the length of the image in the first direction and the length of the image in the second direction, is set to be constant in the image group. Alternatively, the longer length, of the length of the image in the first direction and the length of the image in the second direction, is set to be constant in the image group. Thereby, even when an image longer in the second direction than the first direction and an image longer in the first direction than the second direction are mixed in the image group, since a space between the images becomes narrow, the images can be arranged while maintaining the relationship between the images in a narrow space between the images. As a result, browsing becomes easy.

What is claimed is:

1. A display method comprising:
displaying an image group on a display, in the displayed image group, a plurality of images arranged on a first virtual axis being rotated about each of second virtual axes intersecting the first virtual axis, and further rotated about the first virtual axis, the plurality of images being arranged side by side in a first direction, the plurality of images having a first image, wherein
a first length of a first side of the first image in the first direction or a second length of a second side of the first image in a second direction which intersects the first direction is set such that when a ratio of the first length of the first side of the first image to the second length of the second side of the first image is within a predetermined range, a shorter length between the first side and the second side is set to be constant in each of the plurality of images in the image group, and when the ratio is outside the predetermined range, a longer length between the first side and the second side is set to be constant in each of the plurality of images in the image group, and
wherein the predetermined range is a range of $1/\sqrt{2}$ or more and $\sqrt{2}$ or less.

2. The display method according to claim 1, wherein the longer length between the first side and the second side in each of the plurality of images in the image group is set to a predetermined value.

3. The display method according to claim 1, wherein the plurality of images in the image group are displayed to fit in an occupied area of the display by setting the ratio as a predetermined aspect ratio.

4. The display method according to claim 1, wherein in the image group, when a number of the plurality of images in which the first side is longer than the second side of each of the plurality of images is more than a number of the plurality of images in which the second side is longer than the first side of each of the plurality of images, an interval between the plurality of images having more images in which the first side is longer than the second side of each of the plurality of images is displayed wider than an interval between the plurality of images having less images in which the second side is longer than the first side of each of the plurality of images.

5. The display method according to claim 1, wherein when a display area in which the image group is displayed is below a predetermined value, either one of both end portions, that face each other in the second direction, of the plurality of images is aligned and displayed.

6. A display apparatus comprising:
a display configured to display an image group, in the displayed image group, a plurality of images being arranged side by side in a first direction, the plurality of images having a first image;
a memory configured to store a program; and
a processor configured to execute the program so as to:
rotate the plurality of images arranged on a first virtual axis about each of second virtual axes intersecting the first virtual axis; and
rotate the plurality of images about the first virtual axis,
wherein a first length of a first side of the first image in the first direction or a second length of a second side of the first image in a second direction which intersects the first direction is set such that when a ratio of the first length of the first side of the first image to the second length of the second side of the first image is within a predetermined range, a shorter length between the first side and the second side is set to be constant in each of the plurality of images in the image group, and when the ratio is outside the predetermined range, a longer length between the first side and the second side is set to be constant in each of the plurality of images in the image group, and
wherein the predetermined range is a range of $1/\sqrt{2}$ or more and $\sqrt{2}$ or less.

* * * * *